United States Patent
Walker et al.

(10) Patent No.: US 7,950,997 B2
(45) Date of Patent: May 31, 2011

(54) METHOD AND APPARATUS FOR GENERATING DIRECTIVES FOR PERSONNEL

(75) Inventors: Jay S. Walker, Ridgefield, CT (US); James A. Jorasch, Stamford, CT (US); Russell P. Sammon, San Francisco, CA (US); Scott T. Friesen, Stamford, CT (US); Geoffrey M. Gelman, Stamford, CT (US); Stephen C. Tulley, Fairfield, CT (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 11/552,793

(22) Filed: Oct. 25, 2006

(65) Prior Publication Data

US 2007/0087810 A1    Apr. 19, 2007

Related U.S. Application Data

(62) Division of application No. 10/212,636, filed on Aug. 2, 2002, now abandoned.

(60) Provisional application No. 60/309,972, filed on Aug. 3, 2001.

(51) Int. Cl.
*A63F 9/24* (2006.01)
*A63F 13/00* (2006.01)
*G06F 17/50* (2006.01)

(52) U.S. Cl. ......... 463/25; 463/40; 703/14.1; 703/14.12

(58) Field of Classification Search ............ 463/25, 463/40; 705/14.1, 14.12
See application file for complete search history.

(56) References Cited

U.S. PATENT DOCUMENTS

| | | | |
|---|---|---|---|
| 5,025,372 A | | 6/1991 | Burton et al. |
| 5,179,517 A | | 1/1993 | Sarbin et al. |
| 5,636,346 A | | 6/1997 | Saxe |
| 5,721,827 A | | 2/1998 | Logan et al. |
| 5,761,647 A | | 6/1998 | Boushy |
| 5,794,210 A | | 8/1998 | Goldhaber et al. |
| 5,816,918 A | * | 10/1998 | Kelly et al. ............ 463/16 |
| 5,826,240 A | | 10/1998 | Brockman et al. |
| 5,971,271 A | | 10/1999 | Wynn et al. |
| 5,983,196 A | | 11/1999 | Wendkos |
| 6,178,408 B1 | | 1/2001 | Copple et al. |
| 6,201,948 B1 | | 3/2001 | Cook et al. |
| 6,257,981 B1 | | 7/2001 | Acres et al. |
| 6,280,328 B1 | * | 8/2001 | Holch et al. ............ 463/42 |
| 6,343,990 B1 | | 2/2002 | Rasmussen et al. |
| 6,394,907 B1 | | 5/2002 | Rowe |
| 6,866,586 B2 | | 3/2005 | Oberberger et al. |
| 6,962,531 B2 | * | 11/2005 | Pace et al. ............ 463/42 |
| 7,094,149 B2 | | 8/2006 | Walker et al. |
| 2002/0013728 A1 | * | 1/2002 | Wilkman ............ 705/14 |

(Continued)

OTHER PUBLICATIONS

Martinez, Ruben, "Managing Casinos", Barricade Book, Inc., 1995, pp. 99-104, 125-137, 139-146, 17pp.*

(Continued)

*Primary Examiner* — Melba Bumgarner
*Assistant Examiner* — Jasson H Yoo
(74) *Attorney, Agent, or Firm* — K&L Gates LLP

(57) ABSTRACT

A system and method include determining a recipient of an offer; and determining an offer which includes an activity and a benefit. The system and method further include transmitting, to a representative, instructions to provide the offer to the recipient. The system and method further include determining whether the recipient has performed the activity, and if so providing the benefit to the recipient.

6 Claims, 11 Drawing Sheets

U.S. PATENT DOCUMENTS

2003/0013515 A1* 1/2003 Rowe et al. .............. 463/25

OTHER PUBLICATIONS

Freedman, Robert J. et al., "Should sales support employees get incentive pay?", Sales and Marketing Management, Jan. 1989, Section: vol. 141, No. 1, p. 30, ISSN: 0163-7517, 6pp.

Shulman, Richard E., "Make sure training is 'in the loop.'", Supermarket Business, Mar. 1992, Section: vol. 47, No. 3, p. 19, ISSN: 0196-5700, 4pp.

O'Neil, Jack, "'Cashless' Casino, Thanks to Computers: Mashantucket Pequot Tribe's casino is networked to the hilt", Lan Times, Sep. 28, 1992, p. 57, vol. 9, Issue 18, 5pp.

Shulman, Richard, "Designing for efficiency; category management in wholesale and retail trade", Supermarket Business, Mar. 1996, Section: vol. 51, No. 3, p. 57, ISSN: 0196-5700, 4pp.

Shulman, Richard, "Succeeding with frequent shoppers.", Supermarket Business, Jun. 1996, Section: vol. 51, No. 6, p. 33, ISSN: 0196-5700, 5pp.

Shulman, Richard, "A new look at old applications", Supermarket Business, Jul. 1996, Section: vol. 52, No. 7, p. 43, ISSN: 0196-5700, 5pp.

Emond, Mark, "Rebel Oil: helping to develop POS automation that does it all; Rebel Oil Co.; includes related article on alliance among Convenient Automation, Tandem and Microsoft Cover Stor)" Oct. 1996, Section: No. 11, vol. 88, p. 28, ISSN: 0149-5267, 7pp.

Ling, Teh Hooi, "Prices of handphones dive, thanks to cross-subsidies", Business Times (Singapore), Apr. 8, 1998, Section: p. 1, 2pp.

"FYI, Calls are free, after the ads", Star Tribune (Minneapolis, MN), Jan. 14, 1999, Section: p. 1D, 1pg.

Ellin, Abby, "Listening To an Earful for Savings", The New York Times, Jan. 24, 1999, Section: Section 3, p. 11, col. 1, Money and Business/Financial Desk, 2pp.

Williams, Mina, "Jewel-Osco Age Verification Helps Fight Youth Drinking.", Supermarket News, Feb. 22, 1999, Section: p. 24, ISSN: 0039-5803, 2pp.

Thaler-Carter, Ruth E., "Why sit and answer the phone all day? call-center employees", HR Magazine, Mar. 1, 1999, Section: No. 3, vol. 44, p. 98, ISSN: 1047-3149. 5pp.

Francella, Barbara Grondin, "Security Solutions Abound.", Convenience Store News, May 31, 1999, Section: No. 7, vol. 35, p. 127, ISSN: 0194-8733, 6pp.

"Pivotal and Incentive Systems Team to Motivate", Business Wire, Jul. 19, 1999, 3pp.

Bleiberg, Ron, "Selecting customer support software", Call Center Solutions, Aug. 1, 1999, Section: No. 2, vol. 18, p. 62, ISSN: 1521-0774, 4pp.

Francella, Barbara Grondin, "Avoiding the Trap.", Convenience Store News, Aug. 2, 1999, Section: No. 10, vol. 35, p. 130, ISSN: 0194-8733, 3pp.

"Again Technologies Releases CompSense 5.0 Variable Pay Software Management Solution; Companies Can Now Truly Tie Employee Performance to Corporate Objectives", Business Wire, Sep. 28, 1999, 3pp.

"Point of Sale Software—Innovative Business Components (IBC)", (http //www innovativepccom/ibc05b htm), download date: Nov. 2, 1999, 3pp.

"TPI Point of Sale Systems", (http www tpiweb net/body_products htm), download date: Nov. 8, 1999, 4pp.

"Products and Services—ASPIRE, Automated System Promoting Incentives that Reward Excellence!", (http www 4aspire com/ newsite/links/products%20and%20service htm), download date: Dec. 20, 1999, 2pp.

"Synygy, Inc.—Incentive Compensation Management and Incentive Compensation Outso..", (http www simulate com/ OutsourcingServices/IncentiveCompensationServices html), download date: Dec. 23, 1999, 7pp.

The Lectric Law Library's Legal Lexicon on Agent, Agency, (http://www.lectriclaw.com/def/a026.htm), 5pp.

Martinez, Ruben, "Managing Casinos" Barricade Books, Inc., 1995, pp. 99-104, 125-137, 139-146 (17pp.).

* cited by examiner

| PLAYER IDENTIFIER 540 | PLAYER NAME 550 | SESSION THEORETICAL WIN 560 | CURRENT LOCATION 570 | NOTES 580 |
|---|---|---|---|---|
| 123456 | JOE SMITH | $135 | SLOT MACHINE #66 | LAST 10 SPINS HAVE BEEN LOSING OUTCOMES |
| 123589 | MARY WHITE | $205 | BLACKJACK TABLE #4 | LIKES TO PLAY GOLF |
| 123647 | ALAN GREEN | $75 | CASHIER WINDOW #2 | STAYING AT HOTEL |

510 → (row 1)
520 → (row 2)
530 → (row 3)

FIG. 5

| OFFER CONDITION 640 | OFFER IDENTIFIER 650 |
|---|---|
| IF PLAYER IS NOT USING A PLAYER TRACKING CARD | OF 475 |
| IF PLAYER AGE > 50 AND PLAYER IS IDENTIFIED BY CASINO REPRESENTATIVE | OF 306 |
| IF PLAYER LIKES TO PLAY GOLF AND IS CURRENTLY PLAYING $5.00 VIDEO POKER | OF 306 |
| IF PLAYER IS STAYING IN A STANDARD ROOM, SESSION THEORETICAL WIN > $150.00 AND > 5 SUITES ARE AVAILABLE | OF 224 |
| IF HOTEL OCCUPANCY RATE IS < 80% | OF 832 |

FIG. 6

| OFFER IDENTIFIER 760 | ACTIVITY 770 | BENEFIT 780 |
|---|---|---|
| OF 362 | SIGN UP FOR CASINO CO-BRANDED CREDIT CARD | FREE DINNER AT STEAKHOUSE |
| OF 475 | SIGNING UP FOR PLAYER TRACKING CARD | $10 IN QUARTERS FROM CASHIER |
| OF 983 | PLAYING 200 MORE HANDLE PULLS AT A SLOT MACHINE | FREE ROOM UPGRADE |
| OF 993 | COMPLETE 10 FLUSHES AND 10 STRAIGHTS IN JACKS OR BETTER VIDEO POKER | WILD CARD ADDED TO DECK FOR NEXT 10 HANDS |
| OF 998 | AGREE TO SWITCH LONG DISTANCE SERVICE PROVIDER FOR AT LEAST 6 MONTHS | BLACKJACKS PAY 2 TO 1 FOR NEXT HOUR (UP TO $100 MAX. BET) |

Rows: 710, 720, 730, 740, 750

FIG. 7

| REPRESENTATIVE IDENTIFIER 850 | CURRENT LOCATION 860 | CURRENT ACTIVITY 870 | COMMISSION EARNED 880 |
|---|---|---|---|
| CR 127 | SLOT MACHINE #5 | PRESENTING OFFER | $78 |
| CR 243 | VIDEO POKER ROOM | SERVING DRINKS | $24 |
| CR 312 | LOBBY #2 | UNOCCUPIED | $18 |
| CR 907 | N/A | OFF-DUTY | $0 |

810 → (row 1)
820 → (row 2)
830 → (row 3)
840 → (row 4)

FIG. 8

| MADE OFFER IDENTIFIER 930 | OFFER IDENTIFIER 935 | PLAYER IDENTIFIER 940 | REPRESENTATIVE IDENTIFIER 945 | OFFER ACCEPTED? 950 | ACTIVITY PERFORMED? 955 | BENEFIT PROVIDED 960 |
|---|---|---|---|---|---|---|
| MOF 001 | OF 475 | 123456 | CR 127 | ACCEPTED | YES | YES |
| MOF 002 | OF 475 | 123927 | CR 127 | REJECTED | NO | NO |
| MOF 003 | OF 983 | 123456 | CR 127 | ACCEPTED | YES | YES |
| MOF 004 | OF 501 | 123522 | CR 139 | PENDING | NO | YES |

910 → MOF 001
915 → MOF 002
920 → MOF 003
925 → MOF 004

FIG. 9

METHOD AND APPARATUS FOR GENERATING DIRECTIVES FOR PERSONNEL

The present application is a divisional application of U.S. application Ser. No. 10/212,636 filed Aug. 2, 2002; now abandoned which claims the benefit of priority of U.S. Provisional Application No. 60/309,972, filed Aug. 3, 2001. Each of the above-referenced applications is incorporated by reference herein in its entirety.

BACKGROUND OF THE INVENTION

The present invention relates to methods and apparatus for directing personnel, such as employees.

Casinos and other entities employ personnel in various capacities. Such personnel may be employed to, e.g., assist customers, promote customer satisfaction, or similarly deal with customers in a positive manner.

Particularly in casinos, customers are players who play games of chance, such as poker, blackjack, keno and slot machines. Some games are table based, such as a table game of poker or blackjack, and others are played using devices, such as slot machines, video poker machines, video blackjack machines and keno machines. Such games typically involve a monetary wager, where a player may win funds in the form of cash, chips, or other monetary forms.

In a casino, as in other businesses, customer satisfaction may be increased in several ways, such as by offering better service to such customers.

BRIEF DESCRIPTION OF THE DRAWINGS

FIG. 5 is a table illustrating an exemplary data structure of a player database for use in an embodiment of the present invention.

FIG. 6 is a table illustrating an exemplary data structure of an offer determination database for use in an embodiment of the present invention.

FIG. 7 is a table illustrating an exemplary data structure of an offer database for use in an embodiment of the present invention.

FIG. 8 is a table illustrating an exemplary data structure of a representative database for use in an embodiment of the present invention.

FIG. 9 is a table illustrating an exemplary data structure of an offer tracking database for use in an embodiment of the present invention.

DETAILED DESCRIPTION OF THE INVENTION

Applicants have recognized that various companies spend great amounts of money and other resources acquiring customers, marketing products to customers, and obtaining information about potential customers.

Applicants have also recognized that sales techniques of such companies may be improved in accordance with certain embodiments of the present invention.

Applicants have also recognized that personnel, such as personnel of a casino or other service or hospitality establishment, have periods of time when they are on duty (and presumably being paid) but have no tasks to perform. Applicants have recognized that such time may be effectively used with certain embodiments of the present invention.

In general, an embodiment of the present invention allows an employee of a casino or other business (the employee referred to as a "representative") to work with a computer system to determine an offer and present it to a recipient, such as a player at a gaming device. For example, a representative on the floor of a casino may carry a PDA (personal digital assistant) or other device, such as a cellular telephone or other wireless electronic device. Using the PDA, the representative may identify players who should receive offers.

Such an offer may comprise an activity for the player to perform, and a corresponding benefit to the player in exchange for the performance or promise to perform the activity. For example, the offer may be to receive a bonus of five hundred credits in exchange for applying for a new credit card account.

The representative may then approach the player and ask him whether he would like to accept the offer. For example, the representative may ask the player, "Hello, Mr. Smith. My name is Karen and I work here at the Lucky Dice Casino. Based on your slot play over the last couple of days, we've determined that you're eligible to receive a bonus of 500 credits if you sign up for a new Big Bank credit card. Would you like to accept this offer and receive your bonus of 500 credits?"

If the player accepts the offer, then the representative may use the PDA to transmit the acceptance to the casino's central computer. The benefit designated in the offer may then be provided to the player (e.g., by crediting a player account accordingly).

Applicants have recognized that people are generally more likely to accept offers that are presented to them by other people (representatives) than offers that are presented to them by devices (e.g. slot machines).

Figure 1:
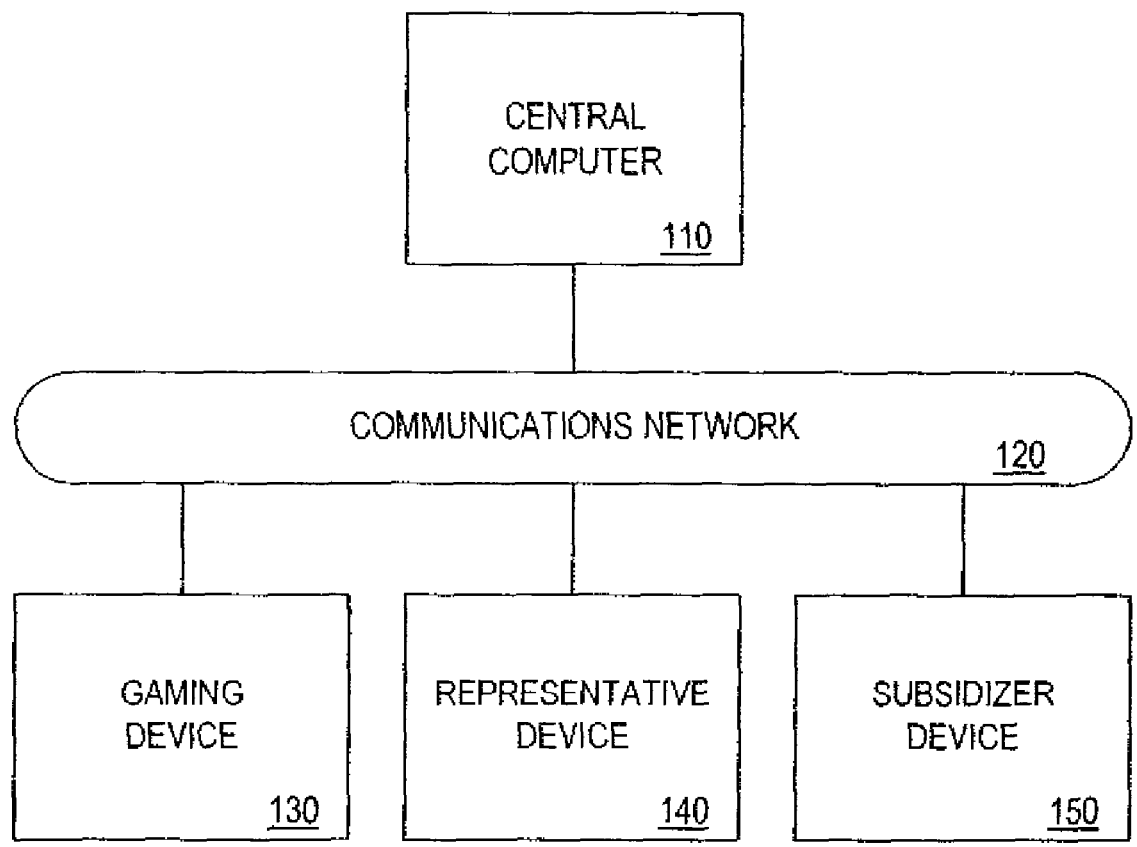
FIG. 1 is a block diagram of a system consistent with one embodiment of the present invention.

Referring now to FIG. 1, an apparatus 100 according to an embodiment of the present invention includes a central computer 110 that is in communication, via a communications network 120, with one or more gaming devices 130 (e.g., slot machine, video poker machines), with one or more representative devices 140 and/or with one or more subsidizer devices 150. The central computer 110 may communicate with the devices 130, 140 and 150 directly, via the Internet, via a wireless medium, via a wired medium such as Ethernet, LAN or WAN or via any appropriate communications means or combination of communications means. Each of the devices 130, 140 and 150 may comprise computers, such as those based on the Intel® Pentium® processor, that are adapted to communicate with the central computer 110. Any number of devices 130, 140 and 150 may be in communication with the central computer 110.

Communication between the devices 130, 140 and 150 and the central computer 110 may be direct or indirect, such as over the Internet through a Web site maintained by central computer 110 on a remote server or over an on-line data network including commercial on-line service providers, bulletin board systems and the like. In yet other embodiments, the devices may communicate with central computer 110 over RF, cable TV, satellite links and the like.

The communication network 120 may permit or facilitate communication between various devices in communication therewith. For example, (i) the central computer may transmit information to a gaming device (e.g., to control its operation); (ii) a gaming device may transmit information to the central computer (e.g., information about a player's gaming activities); (iii) the central computer may transmit information to a representative device (e.g., information about potential offers); (iv) a representative device may transmit information to the central computer (e.g., an indication that an offer has been accepted); (v) a gaming device may transmit information to a representative device (e.g., information about a player's gaming activities); (vi) a representative device may transmit information to a gaming device (e.g., a request to increase a player's credit balance at the slot machine); (vii) a subsidizer device may transmit information to the central computer (e.g., information about available subsidies); and (viii) the central computer may transmit information to a subsidizer device (e.g., a request for payment subsidies in response to activities performed by players). Additional forms of communication will be readily apparent to those of ordinary skill in the art.

Some, but not all, possible communication networks include: a local area network (LAN), a wide area network (WAN), the Internet, a telephone line, a cable line, a radio channel, an optical communications line, a satellite communications link. Possible communications protocols include: Ethernet, Bluetooth, TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The central computer 110 may function as a "Web server" that generates Web pages (documents on the Web that typically include an HTML file and associated graphics and script files) that may be accessed via the Web and allows communication with the central computer 110 in a manner known in the art.

Any or all of the devices 130, 140 and 150 may comprise, e.g., conventional personal computers, portable types of computers, such as a laptop computer, a palm-top computer, a hand-held computer, or a Personal Digital Assistant (PDA). A representative device is typically a PDA in many of the examples presented herein.

Figure 2:
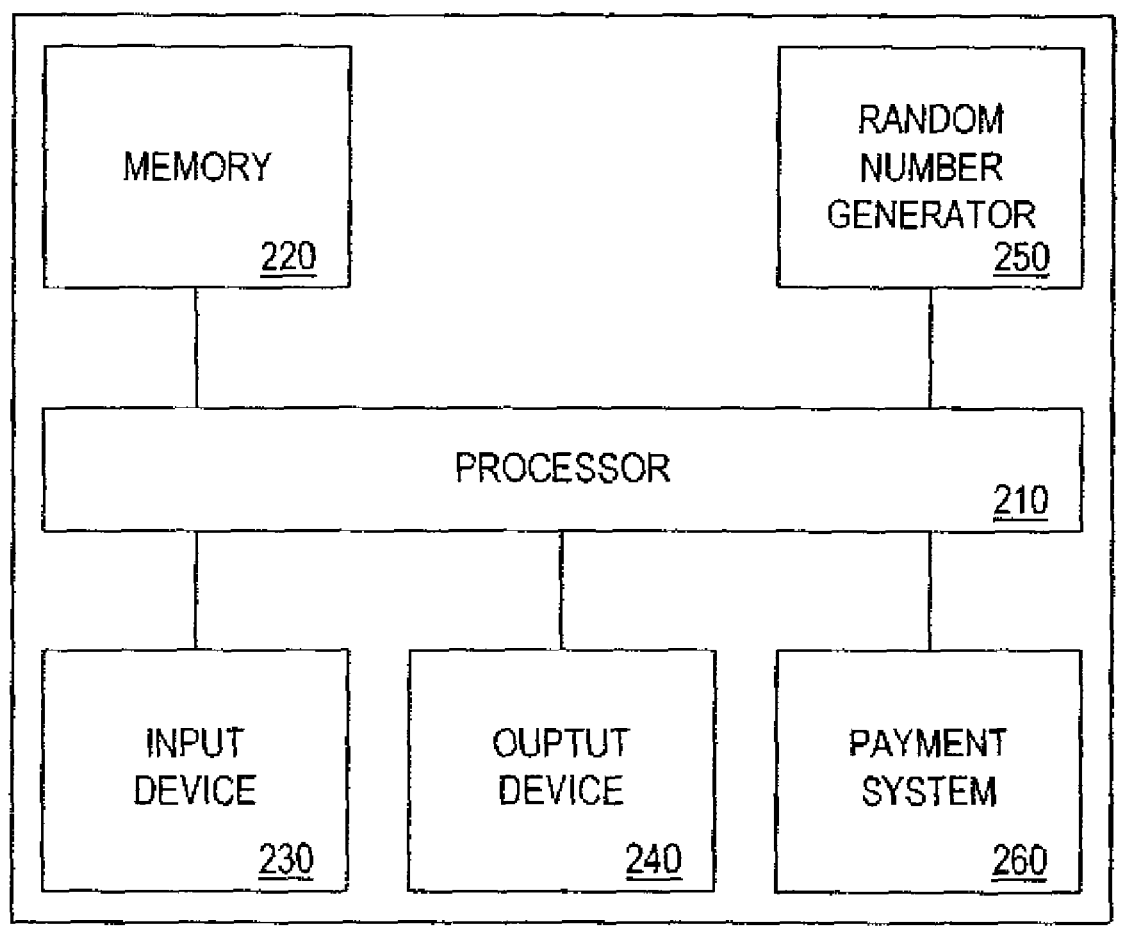
FIG. 2 is a block diagram of one embodiment of a gaming device of the system of FIG. 1.

FIG. 2 illustrates an embodiment 200 of a gaming device. The gaming device may be implemented as a system controller, a dedicated hardware circuit, an appropriately programmed general-purpose computer, or any other equivalent electronic, mechanical or electromechanical device. A gaming device may comprise, for example, a slot machine, a video poker terminal, a pachinko machine or a table-top game. In various embodiments, a gaming device may comprise, e.g., a personal computer, a telephone (e.g., to communicate with an automated sports book that provides gaming services), or a portable handheld gaming device (e.g., a personal digital assistant or Nintendo GameBoy).

In embodiments of the invention addressing table game play such as blackjack, craps, roulette, baccarat, Keno, Bingo, and the like, the gaming device may be hardware located at the game table suitable for entering player identifiers or average bet sizes. A gaming device need not be located in a casino.

The gaming device comprises a processor 210, such as one or more Intel® Pentium® processors. The processor 210 is in communication with a memory 220. The memory 220 may comprise an appropriate combination of magnetic, optical and/or semiconductor memory, and may include, for example, Random Access Memory (RAM), Read-Only Memory (ROM), a compact disc and/or a hard disk. The processor 210 and the memory 220 may each be, for example: (i) located entirely within a single computer or other device; or (ii) connected to each other by a remote communication medium, such as a serial port cable, telephone line or radio frequency transceiver. In one embodiment, the gaming device may comprise one or more devices that are connected to a remote server computer for maintaining databases.

The memory stores a program for controlling the processor 210. The processor 210 performs instructions of the program, and thereby operates in accordance with the present invention, and particularly in accordance with the methods described in detail herein. The program may be stored in a compressed, uncompiled and/or encrypted format. The program furthermore includes program elements that may be necessary, such as an operating system, a database management system and "device drivers" for allowing the processor 210 to interface with computer peripheral devices. Appropriate program elements are known to those skilled in the art, and need not be described in detail herein.

According to an embodiment of the present invention, the instructions of the program may be read into a main memory from another computer-readable medium, such as from a ROM to RAM. Execution of sequences of the instructions in the program causes processor 210 to perform the process steps described herein. In alternative embodiments, hard-wired circuitry may be used in place of, or in combination with, software instructions for implementation of the processes of the present invention. Thus, embodiments of the present invention are not limited to any specific combination of hardware and software.

The gaming device also includes an input device 230, which is a device that is capable of receiving an input from a player. Examples of input devices include, but are not limited to, a computer keyboard, a computer mouse, a touch screen, a button, a handle, a microphone, a video camera, a magnetic stripe reader (e.g., to read a player tracking card), a biometric input device (e.g., a fingerprint or retinal scanner), a radio antenna (e.g., for receiving inputs from a second gaming device), a voice recognition module, a coin or bill acceptor. For gaming devices, common input devices include a button or touch screen on a video poker machine, a lever or handle connected to the gaming device, and a magnetic stripe reader to read a player tracking card inserted into a gaming device.

The gaming device includes an output device 240, which is a device that may be used to output information from the gaming device to a player. Examples of output devices include, but are not limited to a video monitor, a light-emitting diode (LED), an audio speaker, an electric motor, a printer (e.g., such as for printing cashless gaming vouchers), a coupon or product dispenser, an infra-red port (e.g., for communicating with a second gaming device), a Braille computer monitor, and a coin or bill dispenser. For gaming devices, common output devices include a cathode ray tube (CRT) monitor on a video poker machine, a bell on a gaming device (e.g., rings when a player wins), an LED display of a player's credit balance on a gaming device, an LCD display of a personal digital assistant (PDA) for displaying keno numbers.

The gaming device may include a random number generator 250, which generates data representing random or pseudo-random values. The random number generator 250 may be implemented in hardware, software or a combination thereof in a manner known in the art.

The gaming device includes a payment system 260 which is a device capable of accepting payment from a player (e.g., a bet or initiation of a balance) and/or providing payment to a player (e.g., a payout). Payment is not limited to money, but may also include other types of consideration, including products, services, and alternate currencies.

Exemplary methods of accepting payment by the payment system include (i) receiving hard currency (i.e., coins or bills), and accordingly the payment system 260 may comprise a coin or bill acceptor; (ii) receiving an alternate currency (e.g., a paper cashless gaming voucher, a coupon, a non-negotiable token), and accordingly the payment system 260 may comprise a bar code reader or other sensing means; (iii) receiving a payment identifier (e.g., a credit card number, a debit card number, a player tracking card number) and debiting the account identified by the payment identifier; and (iv) determining that a player has performed a value-added activity.

Exemplary methods of providing payment to a player include (i) dispensing hard currency (i.e., coins or bills); (ii) dispensing an alternate currency, such as a paper cashless gaming voucher, a coupon, a non-negotiable token; (iii) crediting a player account (e.g., a bank account or other financial account) which is identified by a payment identifier (e.g., a credit card number, a debit card number, a player tracking card number); and (iv) providing a product or service to the player (e.g., a jackpot prize may be a new car).

In one embodiment, a player may operate a plurality of gaming devices. For example, a player may simultaneously play two side-by-side gaming devices, a player may play one gaming device (e.g. a gaming device) and then continue his gaming session at another gaming device (e.g. a video poker machine), and a player may remotely operate a gaming device, possibly by using a telephone, PDA or other device (i) to transmit commands (directly or indirectly) to the gaming device, such as wager amounts and commands to select certain cards; and/or (ii) to receive output (directly or indirectly) from the gaming device.

In one embodiment, a gaming device may allow a player to play a game of skill rather than a game of chance. Such an embodiment may be more appealing to certain players or may be permitted in areas where it is illegal to gamble on games of chance.

Figure 3:
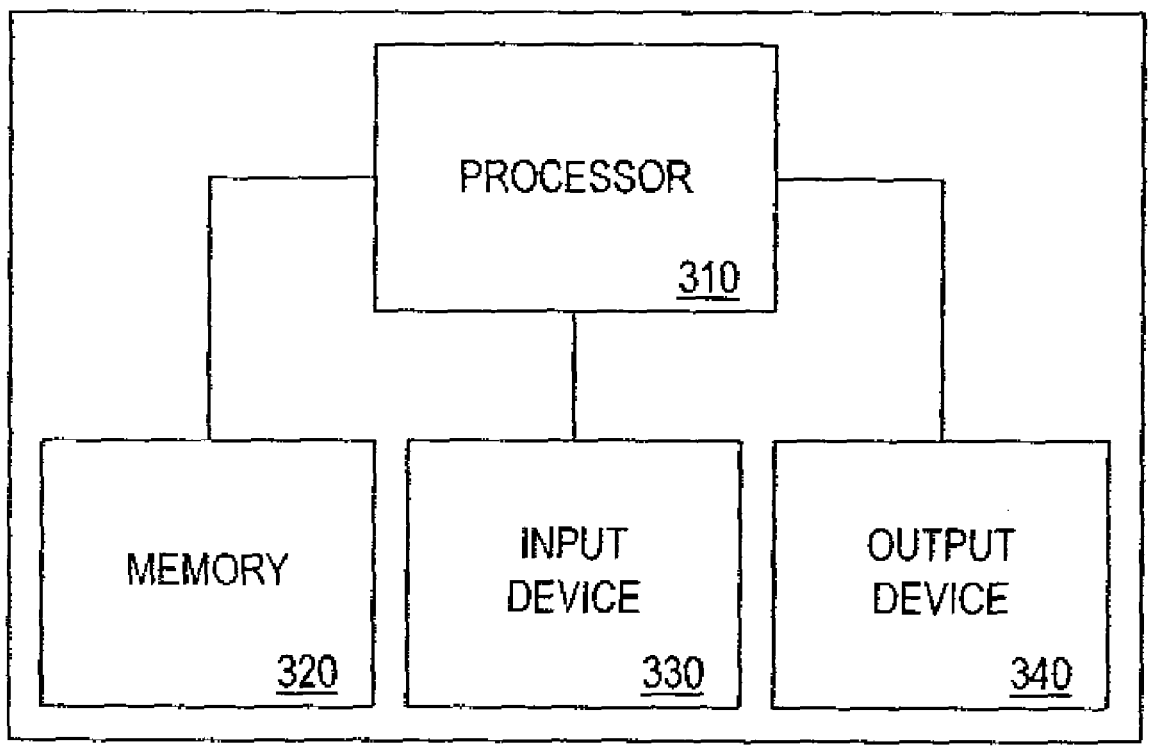
FIG. 3 is a block diagram of one embodiment of a representative device of the system of FIG. 1.

Referring to FIG. 3, an embodiment 300 of a representative device is shown. The representative device includes a processor 310, memory 320, one or more input devices 330 and one or more output device 340, as described above with respect to the embodiment 200 of the gaming device. According to one embodiment, a representative device may comprise, for example, a PDA (e.g., made by Palm, Handspring or Blackberry), a tablet computer, a notebook computer (e.g., running Microsoft Windows), a wearable computer, a cellular telephone (e.g., to allow a representative to interact with the central computer using an interactive voice recognition unit (IVRU)), a walkie-talkie, a cash register (e.g., including a touch screen) or an Internet-enabled kiosk. In several examples presented herein, a representative device is implemented as a PDA carried by a representative.

In an embodiment where a representative device is a PDA, common input devices include a touch screen, a keypad, a microphone and/or a magnetic stripe reader (e.g., for scanning player tracking cards). For PDAs, common output devices include a liquid crystal display screen, an audio speaker, and/or a dot-matrix printer.

The PDA may have Internet access, either directly through a wireless modem or through its communication with another device that has Internet access.

As described in detail herein, a representative device is operable to assist or permit a representative to perform several functions, including but not limited to viewing information relating to players (e.g., a player's name, session win, hobbies), indicating information relating to players (e.g., indicating a player who would like to receive an offer), viewing information relating to offers (e.g., offer details, lists of potential offers), and/or indicating information relating to offers (e.g., whether an offer was accepted or rejected).

A representative may operate one or more representative devices. For example, a representative may use a first PDA to view information about potential offers and a second PDA to view information about a player's gaming activities.

In one embodiment, a particular representative device may be associated with a specific representative. For example, a representative may wear an earphone walkie-talkie, which allows him to receive audio prompts from the central computer. In one embodiment, a particular PDA may be associated with a plurality of representatives. For example, five representatives may take turns using a cash register at a bar to perform functions such as viewing potential offers and indicating player information.

Figure 4:
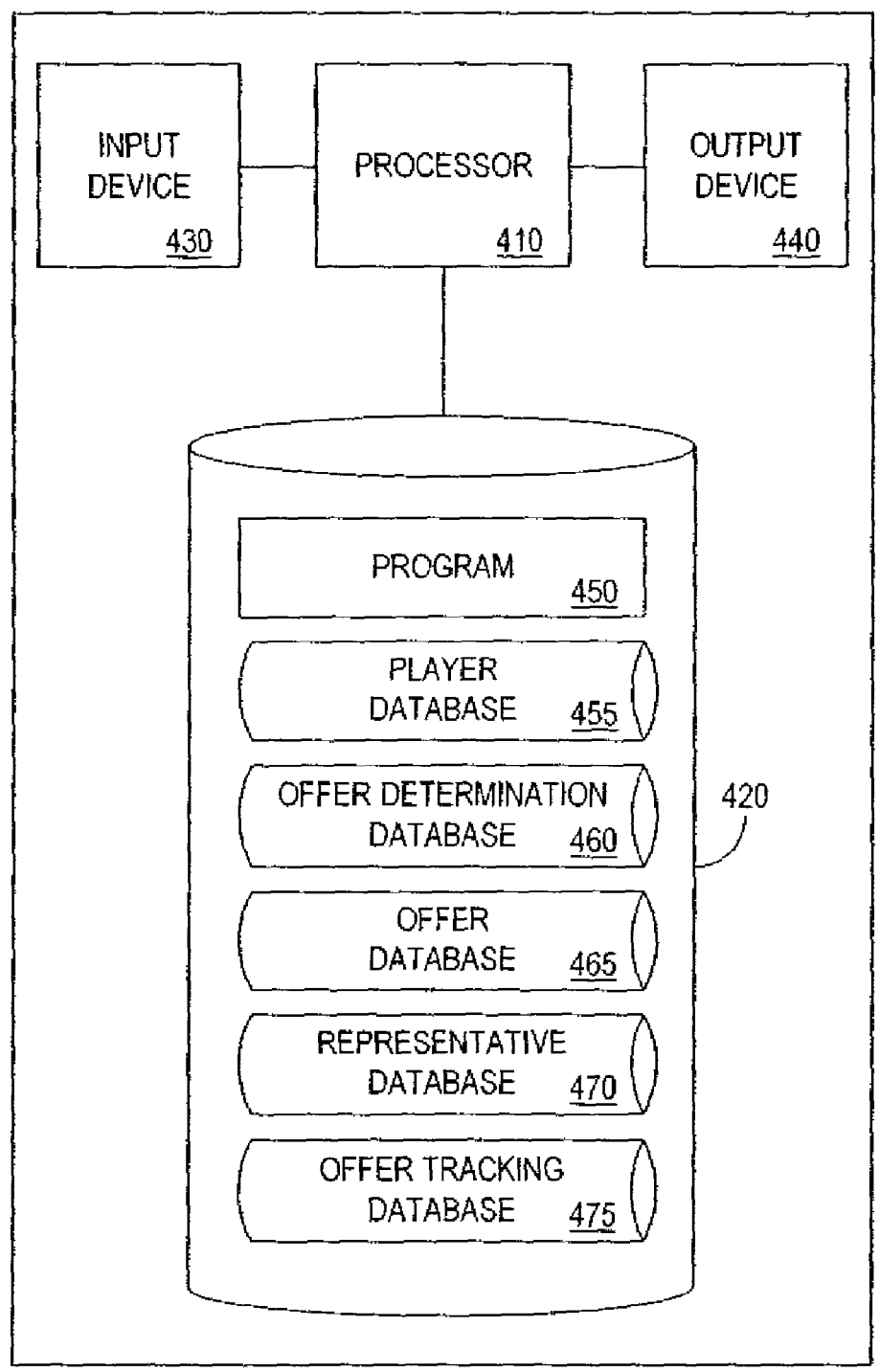
FIG. 4 is a block diagram of one embodiment of a central computer of the system of FIG. 1.

Referring to FIG. 4, an embodiment 400 of the central computer includes a processor 410, memory 420, one or more input devices 430 and one or more output devices 440, as described above with respect to the embodiment 200 of the gaming device. In one embodiment, the central computer comprises one or more computers, such as server computers.

The memory 420 stores a program 450 for controlling the processor 410. The processor 410 performs instructions of the program 450, and thereby operates in accordance with the present invention, and particularly in accordance with the methods described in detail herein. The program may be stored in a compressed, uncompiled and/or encrypted format. The program furthermore includes program elements that may be necessary, such as an operating system, a database management system and "device drivers" for allowing the processor 410 to interface with computer peripheral devices. Appropriate program elements are known to those skilled in the art, and need not be described in detail herein.

According to an embodiment of the present invention, the instructions of the program may be read into a main memory from another computer-readable medium, such as from a ROM to RAM. Execution of sequences of the instructions in the program causes processor 410 to perform the process steps described herein. In alternative embodiments, hard-wired circuitry may be used in place of, or in combination with, software instructions for implementation of the processes of the present invention. Thus, embodiments of the present invention are not limited to any specific combination of hardware and software.

The memory 420 also stores a player database 455, an offer determination database 460, and offer database 465, a representative database 470 and an offer tracking database 475, each of which is described in detail herein.

In addition, the central computer may store information about subsidizers in a subsidizer database (not shown). Such a subsidizer database may include, e.g. information identifying the subsidizer, information about offers made on the subsidizers behalf, information about what may be due the subsidizer, and information about what may be owed by the subsidizer.

Referring to FIG. 5, a tabular representation 500 of the player database includes a number of example records or entries 510, 520 and 530, each defining a player. Those skilled in the art will understand that the player database may include any number of entries. The tabular representation 500 also defines fields for each of the entries or records. The fields specify: (i) a player identifier 540 that uniquely identifies the player; (ii) a player name 550; (iii) a session theoretical win 560; (iv) a current location of the player; and (v) notes regarding the player, such as interests, hobbies, and information useful in determining offers the player may be more likely to accept. Characteristics of a player may be particularly useful in determining an offer to present to the player, as is described in detail herein.

Notes may be (i) entered by the representative; (ii) entered by a casino employee; (iii) automatically determined or calculated by the gaming device and/or the central computer; (iv) entered by the player; or (v) any combination thereof.

Player database may further include any other data related to a player, including but not limited to (i) amount lost or won in the current gaming session; (ii) amount won or lost during this stay at the casino, during this vacation or during any other desired time period; and (iii) activities performed during his stay at a casino.

Referring to FIG. 6, a tabular representation 600 of the offer determination database includes a number of example records or entries 610, 615, 620, 625 and 630, each defining a condition and corresponding offer. Those skilled in the art will understand that the offer condition database may include any number of entries. The tabular representation 600 also defines fields for each of the entries or records. The fields specify: (i) an offer condition 640 which, when true, specifies that the corresponding offer should be made, or is allowed to be made; and (ii) an offer identifier 650 which uniquely identifies the offer. In the depicted embodiment, the offer to be made is represented by an offer identifier, which in turn is used to specify information about an offer stored in the offer database, described in more detail below.

The data stored in the offer determination database may be used to specify conditions under which certain offers should be made, or conditions under which certain offers are allowed to be made.

Referring to FIG. 7, a tabular representation 700 of the offer database includes a number of example records or entries 710, 720, 730, 740 and 750, each defining an offer. Those skilled in the art will understand that the offer database may include any number of entries. The tabular representation 700 also defines fields for each of the entries or records. The fields specify: (i) an offer identifier 760 which uniquely identifies the offer; (ii) an activity 770; and (iii) a benefit 780. According to one embodiment, the activity must be performed by the offer recipient (e.g., a player) in order to receive the benefit.

According to one embodiment, the offer database may also store information about subsidies associated with offers.

Referring to FIG. 8, a tabular representation 800 of the representative database includes a number of example records or entries 810, 820, 830 and 840, each defining a representative. Those skilled in the art will understand that the representative database may include any number of entries. The tabular representation 800 also defines fields for each of the entries or records. The fields specify: (i) a representative identifier 850 which uniquely identifies the representative; (ii) a current location 860 of the representative, which may indicate a general geographic location and/or a specific gaming device engaged by the representative; (iii) a current activity 870 of the representative which may be utilized, e.g., in embodiments where the down time of the representative is determined; and (iv) a commission earned 880 by the representative during the shift or other time period, which commission may be expressed in various manners, such as a commission earned in the current shift.

Referring to FIG. 9, a tabular representation 900 of the offer tracking database includes a number of example records or entries 910, 915, 920 and 925, each defining an offer that has been made. Those skilled in the art will understand that the offer tracking database may include any number of entries. The tabular representation 900 also defines fields for each of the entries or records. The fields specify: (i) a made offer identifier 930 which uniquely identifies an offer that has been made or provided to a recipient; (ii) an offer identifier 935 (corresponding to an offer identifier of the offer database of FIG. 7) which describes the offer that has been made, and thus the corresponding activity and benefit; (iii) a player identifier 940 (corresponding to player identifiers of the player database of FIG. 5) which uniquely identifies the player who received the offer made; (iv) a representative identifier 945 (corresponding to representative identifiers listed in representative database of FIG. 8) which uniquely identifies the representative who made the offer; (v) an indication 950 of whether the offer was accepted; (vi) an indication 955 of whether the activity corresponding to the offer has been completed; and (vii) an indication 960 of whether the benefit has been provided.

Figure 10:
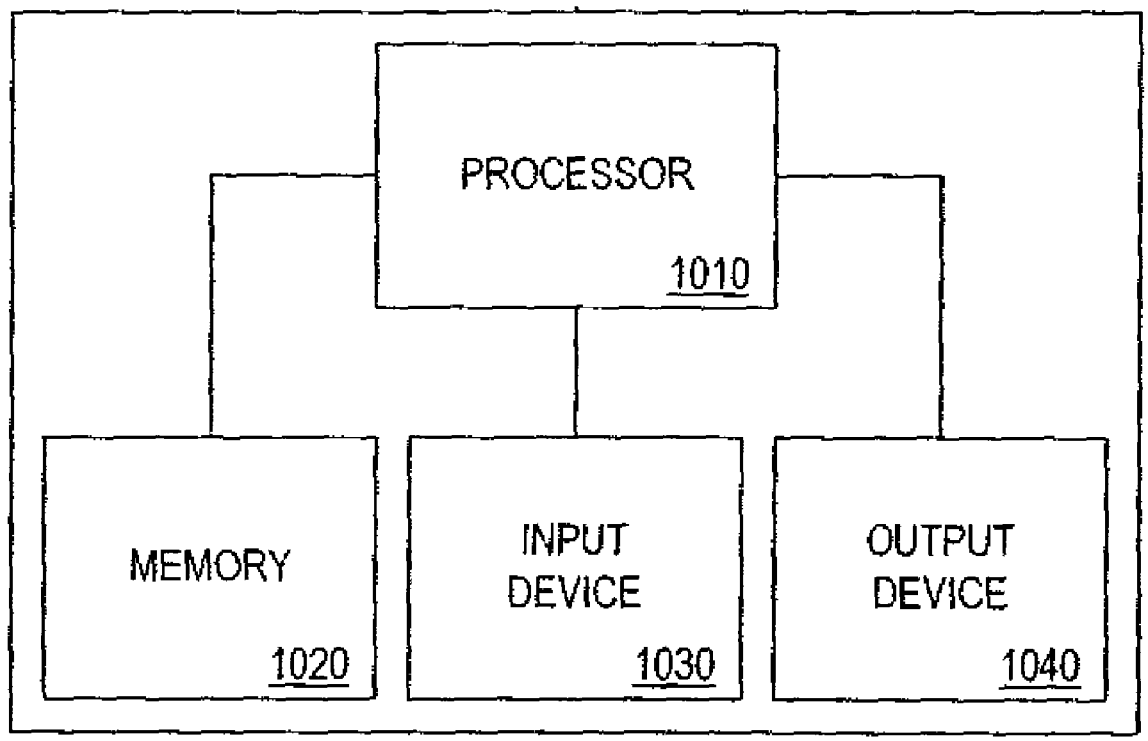
FIG. 10 is a block diagram of one embodiment of a subsidizer device of the system of FIG. 1.

Referring to FIG. 10, an embodiment 1000 of a subsidizer device is shown. The subsidizer device includes a processor 1010, memory 1020, one or more input devices 1030 and one or more output devices 1040, as described above with respect to the embodiment 200 of the gaming device. According to one embodiment, a subsidizer device may comprise, for example, a personal computer, a mainframe computer, or any other computer or computer-based device that allows a subsidizer to communicate appropriately with the central computer. Such devices are known to those skilled in the art and need not be discussed in detail herein.

Communications between a subsidizer and the central computer may include, but are not limited to transmitting and receiving information relating to activities by players; transmitting and receiving information relating to benefits for players; and transmitting and receiving information relating to subsidies provided by the subsidizer.

According to one embodiment, a subsidizer may provide a subsidy to an offer recipient (e.g., a player) or to the casino or other offering party. Such a subsidy may be provided in exchange for the player performing an activity. For example, a subsidizer that is a bank may find it advantageous to require the customer to perform a pricing activity, such as signing up for a credit card issued by that bank.

Figure 11:
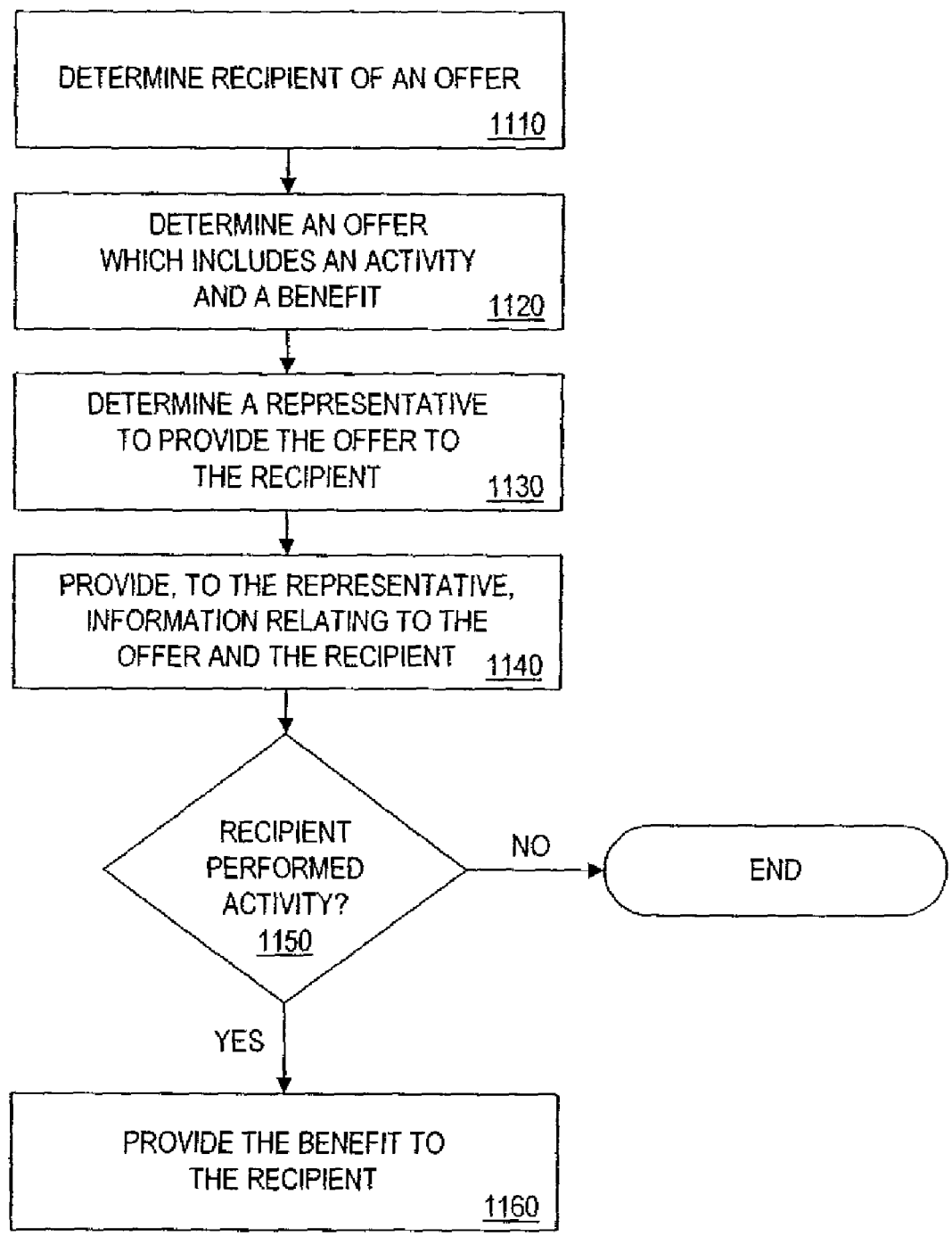
FIG. 11 is a flowchart illustrating a process that may be performed with the system of FIG. 1.

Referring to FIG. 11, a flow chart 1100 represents an embodiment of the present invention that may be performed by the central computer 110 (FIG. 1). The particular arrangement of elements in the flow chart of FIG. 11, as well as the other flow charts discussed herein, is not meant to imply a fixed order to the steps; embodiments of the present invention can be practiced in any order that is practicable.

The steps of the flow chart 1100 are presented, followed by a more detailed description of each step and alternatives thereto in various embodiments of the invention.

The central computer determines a recipient of an offer (step 1110) and also determines an offer which includes an activity and a benefit (step 1120). The central computer also determines a representative to provide the offer to the recipient (step 1130), and provides to the representative information relating to the offer and the recipient (step 1140). Subsequently, the central computer determines whether the recipient has performed the activity (step 1150); and if so provides the benefit to the recipient (step 1160).

In the step 1100 of determining a recipient of an offer, the recipient (e.g., a player in a casino) may be identified by a representative, by the central computer, by the recipient himself, or by a friend or associate of the recipient.

According to one embodiment, a player may be identified by a representative. For example, a representative may use a PDA to identify a player to the central computer. In various embodiments, representatives include, but are not limited to casino hosts, pit bosses, cocktail waitresses, coin changers, card dealers, cashiers, other casino employees, bus drivers and flight attendants.

Methods of identifying a player include indicating (i) the player's name, (ii) the player's identification number (e.g., from a tracking card); (iii) a contact identifier for the player (e.g., the player's cell phone number, email address, credit card number, hotel room, or postal address); (iv) indicating a gaming device that is being operated by the player (e.g., the player at slot machine #25); (v) the player's location—for example, a representative's PDA may have a built-in global position system (GPS) where the location of a player may be determined based on an indication of the player's location relative to the representative's PDA (e.g., "Twenty feet in front of me"); (vi) a sufficient number of characteristics of the player to identify him relative to other players in the area (e.g., male, gray hair, slightly balding, mustache, wearing a red and white Hawaiian-print shirt, smoking cigar, drinking margarita); (vii) an activity being performed by the player (e.g., the player operating the ATM machine); and/or (viii) a biometric of the player (e.g., a scan of the player's fingerprint, a photograph of the player). A player may be identified using a combination of the above or other methods. For example, a representative may identify, "the red-haired player sitting at the bank of slot machines thirty meters in front of me."

In one embodiment, a representative may identify multiple players simultaneously. For example, a representative may indicate that all the players at blackjack table #4 should receive offers.

A representative will typically use a representative device such as a PDA to identify a player, for example, by (i) typing a player's name into a numeric keypad on the PDA; (ii) using a magnetic stripe reader on the PDA to read a player's tracking card number; (iii) using a fingerprint scanner on the PDA to read a player's fingerprint; (iv) using a camera on the PDA to take a picture of the player; and/or (v) using direct indication (e.g., a PDA may have a GPS, an electronic compass, and a laser range finder, and the representative may determine the exact location of the player by pointing the PDA at a player).

Representatives may be very perceptive and highly skilled in determining player's moods and feelings. Such skills would permit a representative to more readily identify players who should receive offers, but who may not have been identified by the central computer. In some embodiments, relative strengths of the representatives and the central computer will complement each other in determining which players should receive offers.

According to one embodiment, the central computer may select a list of one or more players and indicate these players to a representative. The representative may then be prompted to identify at least one player from the list to receive an offer. This prompt may be displayed through a PDA carried by the representative. For example, the representative may be prompted to identify (i) which player appears to be in the best mood (and therefore would be most receptive to an offer); (ii) a player who appears to be with a group (e.g., for an offer that benefits multiple people); (iii) which player would be most receptive to a particular type of offer (e.g., who looks like they are hungry and would want a free meal comp?); (iv) a player who appears to be frustrated by a long wait for a mechanic to fix a machine malfunction or a long wait for a hopper fill; and/or (v) a player who appears to be frustrated by a winning streak by a casino dealer (such as a blackjack dealer who has not busted for a very long time or has been achieving a total of twenty one).

According to one embodiment, a player identified by a representative may be verified by the central computer. For example, a representative may identify a player to receive a new credit card and the central computer may check its records to make sure that the player is a good credit risk.

While a player is at a casino or otherwise engaged in gambling-related activities, various events may occur. For example, a player may arrive at a casino, check into his hotel room, register for a player tracking card, start gambling at a gaming device, win a $100 jackpot, place a keno bet, etc. According to one embodiment of the invention, a player may be identified by the central computer in response to any one or more of these gaming-related activities.

The central computer may identify a player to receive an offer in response to a trigger (also referred to herein as a "trigger event"). A trigger may be any event, circumstance, or condition that results from a player's activities, e.g. at a casino.

Examples of triggers relating to gaming activities performed by the player include, but are not limited to, whether the player registers for a player tracking card; initiates a gaming session; inserts his player tracking card into a gaming device; inserts a coin or bill into a gaming device; makes a bet at a gaming device or table game; makes a maximum bet at a gaming device; wins a jackpot at a gaming device; obtains a winning outcome at a gaming device; obtains a losing outcome at a gaming device (or a losing series of outcomes); finishes a gaming session; presses the "cash out" button on a gaming device or picks up his chips from a blackjack table; presses the "change request" button on a gaming device; obtains an intermediate outcome at a gaming device (e.g., a single card is dealt at video blackjack); is waiting for a fill so that he can be paid coins due; and/or doubles down on a blackjack bet.

Triggers may also comprise other activities performed by the player. Examples of such activities include, but are not limited to, whether the player reserves a hotel room at the casino; checks into or out of a hotel room at the casino; purchases a meal at a restaurant associated with the casino; receives a complimentary beverage; requests a complimentary product or service; receives a complimentary product or service; attends a show or sporting event; usually eats dinner now; and/or must check out of the hotel.

Triggers may also comprise the status of a player's gaming sessions, including but not limited to, whether the player's credit balance at a gaming device is greater or less than a certain value; session win is greater or less than a certain value; session theoretical win is greater or less than a certain value; session coin-in is greater or less than a certain value; year-to-date win is greater or less than a certain value; year-to-date theoretical win is greater or less than a certain value; year-to-date coin-in is greater or less than a certain value; and/or current gaming session is considered on a winning streak or a losing streak.

Triggers may also comprise activities performed by, or the status of a gaming session of, another player who is in some way associated with the player. Conditions relating to other players are similar to the trigger events described herein. Examples of other players associated with the player include, but are not limited to a player who is operating a nearby gaming device; a player who is sharing a room with the player; a player who arrived on the same bus as the player; and family members, friends, and other associates of the player.

Triggers may also comprise conditions or events relating to revenue management considerations of a casino or other entity. Examples include but are not limited to less than a desired number of rooms in a hotel are rented at a certain time (which may result in, e.g., an offer for a discount on a room); less than a desired number of gaming devices are being played at a certain time (which may result in, e.g., an offer which requires an activity of playing a gaming device); and/or other activities of a player are desired in order to derive revenue from the player.

Triggers may also comprise conditions or events relating to offers that have been provided previously, including but not limited to the player completes an activity specified by a previous offer; the player has not performed an activity specified by a previous offer; the number of offers provided exceeds a predetermined quantity (e.g., in an embodiment where only a limited number of offers may be provided or accepted); a new offer, activity or benefit is added to the offer database; and/or the player accepts or rejects an offer.

The central computer may receive information about triggers from a variety of sources, including but not limited to gaming devices (e.g., a slot machine may transmit a message to the central computer when a player inserts his tracking card); input devices (e.g., a check-in terminal in the hotel lobby); casino employees (e.g., a cocktail waitress may use a computer keyboard to indicate that a player received a complimentary beverage); and/or databases accessible by the central computer (e.g., the information about a player's gaming history may be stored in the player database, such as the player database shown in FIG. 5 which may store a player's session coin-in).

In one embodiment, a player may identify himself, such as by pressing a button on a gaming device marked "Give me an offer"; pressing a button on a gaming device marked "Please summon a casino representative"; registering at the casino front desk to receive offers; operating a PDA or other device to identify himself, and/or wearing an identification badge (e.g., a radio frequency identification token, Vividot system by ImageID). Other methods that a player may use to identify himself are analogous to those described for representatives herein. In one embodiment, a player may receive a benefit merely for identifying himself.

In one embodiment, a player may be identified by one of his friends or associates. For example, a friend of a player may talk with a representative and provide information about the player to identify him (e.g., by indicating the player's name, location, cell phone number, etc.). A friend of a player may also use a kiosk, PDA, gaming device, or other device to identify the player (e.g., by indicating the player's current location). Other methods that a friend may use to identify a player are analogous to those described for representatives herein.

In one embodiment, a friend of a player may receive a benefit for identifying the player.

The central computer may determine an offer to present to the identified player. This offer generally includes an activity that should be performed by the player (or obligation to be completed), as well as a benefit to be provided to the player.

According to one embodiment, the central computer determines an activity and a benefit using conditions and corresponding offers. For example, the central computer may store an offer determination database, such as the database depicted in FIG. 6. As described herein, an offer may be provided when the corresponding condition is true. This offer may be identified by an offer identifier. The central computer may then use an offer database (e.g., as depicted in FIG. 7) to determine an activity that should be performed by the player and a benefit that may be provided to the player. For example, a rule might specify a condition such that all dollar slot customers currently playing are offered: a benefit of a free buffet comp if they agree to an activity of a test driving a Ford truck sometime in the next month.

There are many other ways of determining an activity to be performed and a benefit to be provided. Examples include (i) a pseudo-random system. For example, the central computer may randomly select an activity for the player to perform from a list of potential activities (e.g. in a database) and also select a benefit from a list of potential benefits (e.g. in a database); (ii) allowing the player to choose his own offer. For example a player may be allowed to choose an activity to perform from a list of potential activities. The list of potential activities may be determined by the central computer and displayed to the representative. The representative may then present the list of potential activities to the player; (iii) allowing a representative to choose an offer for the player; and/or (iv) determining an activity using a first method and determining a benefit using a second method. For example, an activity may be determined based on which trigger event occurred, whereas a benefit may be determined using a pseudo-random process.

If the central computer uses conditions and corresponding offers to determine an activity and a benefit to present to a player, then the central computer may evaluate one or more types of data in determining whether the condition is true. Some general types of data include, but are not limited to data relating to the trigger, as described herein; characteristics of the player; characteristics of the representative who will present the offer; the player's gaming activities; data relating to the player's visit to the casino (e.g., arrival, hotel stay, meals, entertainment); data relating to other players; the casino's revenues; data relating to subsidies; and/or data relating to offers. Any or all of this information may be made available to the representative, which may assist the representative in providing offers or providing offers more effectively.

Some examples of player characteristics include, but are not limited to information stored in the player database; information determined by a representative (e.g., by talking to the player); the player's hobbies and interests (e.g., sailing, golf); physical characteristics of the player (e.g., age, height, weight, gender, dress and appearance); psychological characteristics of the player (e.g., creativity, risk-aversion, IQ); the player's marital status; the player's occupation, income, work hours, credit report; and/or the player's medical history.

Data representing player characteristics may be, e.g., stored in the player database, entered by the representative, entered by the player, calculated by the central computer or determinable from external data sources.

In various embodiments, a representative (prior to presenting an offer) may be identified before (or simultaneously with) the determination of the offer. In such an embodiment, various characteristics of the representative may be considered in determining the offer. Examples of characteristics of representatives include, but are not limited to the identity of the representative; the acceptance rate of offers made by the representative; the representative's relative ability in providing certain offers or acceptance rate with providing certain offers; the representative's history of making offers (e.g., speed, clarity, acceptance rate with this type of player), which may be determined by accessing the offer tracking database depicted in FIG. 9; physical characteristics of the representative (e.g., age, height, weight, gender, dress, appearance); what type of PDA the representative has (such information is particularly advantageous in an embodiment where certain offers require PDAs to have certain components or capabilities for proper or optimal presentation of the offer. For example, for full effect a particular offer may need to be presented to a player in audio form, such as a jingle or a song. If a representative's PDA does not have a speaker or other audio output device, then it may be difficult for the representative to understand the tune of the jingle. Therefore, it might be better to select a different offer using that particular PDA.); a commission rate, or total commissions paid to the representative (e.g., the offer selected may be an offer which provides the representative with sufficient points to meet his goal for the week); time constraints for the representative (e.g., is the representative's shift going to end soon? Then a short offer should be selected.); and/or the representative's preferences (e.g., does he prefer to make a particular type of offer?).

Data representing characteristics of representatives may be, e.g., stored in the representative database, entered by the representative, calculated by the central computer or determinable from external data sources.

Examples of a player's gaming activities include, but are not limited to the player's past gaming activities (e.g., year-to-date coin-in, coin-in during any appropriate period); the player's present gaming activities (e.g., current credit balance); the player's anticipated future gaming activities (e.g., the player will likely stop gambling in 10 minutes to attend a show at the casino, based on information about the player); metrics of the player's gaming activities (e.g., session theoretical win calculated in a manner known in the art); and/or the player's preferences (e.g., video poker instead of blackjack, based on past gaming sessions of the player).

Data representing gaming activities of players may be, e.g., stored in the player database, entered by the representative, calculated by the central computer or determinable from external data sources.

Examples of the player's visit to the casino include, but are not limited to people who accompanied the player to the casino (e.g., friends, family members); whether the player has reserved a hotel room at the casino; purchases made by the player at the casino (e.g., clothes, souvenirs, food); and/or the duration of the player's visit to the casino.

Data representing a player's visit to the casino may be, e.g., stored in the player database, entered by the representative, calculated by the central computer or determinable from external data sources (e.g. a hotel reservation system, computers of stores or restaurants, credit card network computers).

Examples of the casino's revenue include, but are not limited to less than a desired number of rooms in a hotel are rented at a certain time; less than a desired number of gaming devices are being played at a certain time; and/or activities of players which are desired in order to derive revenue from players.

Data representing a casino's revenue may be, e.g., entered by the representative, calculated by the central computer or determinable from external data sources (e.g. a hotel reservation system, computers of stores or restaurants, credit card network computers).

Data relating to subsidies include, but are not limited to indications by a subsidizer (e.g., a subsidizer may request that a player perform a particular activity); and/or subsidies provided by a subsidizer. For example, a credit card company may pay a casino $50 if a player performs an activity of signing up for a new credit card. In another example, a magazine publisher may give a casino an 80% discount on magazines that are provided as benefits to players.

Data representing subsidies may be, e.g., stored in the offer database and/or offer tracking database, entered by the representative, calculated by the central computer or determinable from external data sources (e.g. a hotel reservation system, computers of subsidizers).

Data relating to offers include, but are not limited to whether the player has completed an activity required by an offer that was previously made; the inventory of offers (e.g., in an embodiment where only a limited number of offers may be provided or accepted); offers that have already been made to the player (e.g., as stored in the offer tracking database shown in FIG. 9); offers that the player has accepted or rejected; offers that have been made to other players (e.g., as stored in the offer tracking database shown in FIG. 9); the activity to be performed by the player (e.g., the benefit may not be determined until after the player completes the activity. According to this embodiment, the benefit may be based on how well the player performs the activity); the benefit to be provided in an offer (e.g., the player may be allowed to select what benefit he would like to earn—based on this benefit, the central computer may determine what activity the player should perform to earn this benefit); and/or whether the player is suitable for a particular type of offer (e.g., if the offer is for a new credit card, what is the player's credit limit? If the offer is for a magazine subscription, does the player already receive the magazine?).

Data representing offers may be, e.g., stored in the player database, offer database and/or offer tracking database, entered by the representative, calculated by the central computer or determinable from external data sources (e.g. a hotel reservation system, computers of subsidizers).

According to one embodiment, an offer need not specify a benefit. In such an embodiment, a benefit may be determined based on the activity performed, or how the activity was performed.

According to one embodiment, a representative may interact with the central computer to assist in determining an offer. For example, a representative may use his PDA to communicate with the central computer and provide information useful in determining an offer. As another example, the central computer may provide the hotel bill of a player to a representative, allowing the representative to more effectively form an offer for that player.

There may be advantages to having a representative assist in selecting an offer to present to a player. Even exceptionally designed computer systems are generally not as adept at interpreting player preferences, feelings, and moods as are people, especially certain types of people. In general, a representative would be capable of more readily determining player preferences, feelings, and moods. Therefore, a representative, especially a well-trained representative, may be able to ascertain or interpret information that an unaided central computer could not. Further, over time a representative who interacts with a player is capable of more thoroughly understanding the preferences of that player. Thus, in one embodiment representatives and the central computer can advantageously cooperate to determine which offers to provide to players.

According to one embodiment, the central computer may generate a list of potential offers and display these to the representative (e.g., on the PDA of the representative). In one embodiment, the central computer may generate a list of potential offers and transmit the list to the PDA of a representative. The representative may then select one (or more) of these potential offers and indicate the selected offer(s) with his PDA through any known manner. The selected offer(s) is communicated to the central computer. The representative may make the selected offer(s) to the player.

In one embodiment, the central computer may generate a first list of potential offers. Using the PDA, the representative may then form a second list of potential offers by (i) proposing changes to the first list of potential offers, or (ii) selecting a new set of potential offers through any known manner. Information input by the representative into his PDA may then be transmitted back to the central computer and used to determine an offer or subsequent list of potential offers for further review by the representative. Accordingly, the representative may be considered to command the central computer to present one or more additional lists of potential offers.

In one embodiment there may be a limited number of offers. For example, there may be offers for hotel rooms at a casino over the weekend, and only a limited number of rooms are available in this time period. Further, a plurality of offers may be made by different representatives simultaneously. For example, each of a plurality of representatives may make an offer to a different respective player. The central computer may display the same list of offers to all the representatives. Each representative in turn may select which offer(s) he would like to make to a player. If a first representative selects an offer that has already been made by a second representative, the central computer may prompt the first representative to select a different offer. The central computer may, at certain times, optionally provide updated lists representing the currently available offers. For example, the central computer may provide representatives with an updated list every ten minutes, or after each offer that is provided.

In one embodiment, the central computer may provide a representative with a list of potential offers and a list of players who may be selected to receive offers. The representative in turn determine which of these offers to make to which of these players. For example, the representative may match an offer with a respective player. In one embodiment, the central computer provides default suggestions of which offers should be made to which players, and the representative can accept the suggestions or selectively override any or all suggestions, e.g., by matching offers and players.

The central computer may provide at least one potential offer to a representative. Certain offers benefit from additional information. For example, the offer may include a benefit or activity which is already enjoyed by the player, and a duplicate of such a benefit or activity would not be desirable to the player (e.g., an activity for the player to switch his long distance service to MCI, but the player may already use MCI). With such offers, it is advantageous to acquire further information (e.g., determine the long distance service of the player). The representative may be charged with determining such information, e.g., by speaking with the player prior to making the offer. If additional information reveals that the offer would not be appealing to the player (e.g., the player already uses MCI) then the representative may indicate to the central computer that a new offer should be selected for the player. The representative may further indicate the additional information (e.g., that the player uses MCI) using his PDA. The central computer may store this information in the player database to be used in formulating future offers to the player.

According to one embodiment, a representative may suggest offers or create new offers. For example, based on a conversation between a representative and a player, the representative may understand that the player enjoys roller coasters. The representative may use this information to provide an offer to the player that includes a benefit of tickets to an amusement park. If there are no offers of the type desired by the representative (e.g., there are no amusement park offers stored) then the representative may use his PDA to command or request that the central computer create such an offer.

The central computer may also request that a representative provide one or more suggestions of offers that may be appropriate for a particular player. The representative may respond by indicating, e.g., "offers that have activities that take less than five minutes" for a player that has demonstrated impatience, or "offers to earn benefits for charities" for a player that has demonstrated altruism.

According to one embodiment, a representative may be prompted to obtain information from a player. This information may then be used by the central computer to determine an appropriate offer for the player. For example, the central computer may store a list of questions (e.g., in the offer database) that, when answered, provide information useful in selecting or forming an offer that is more likely to be accepted. (e.g., "Are you staying at the casino tonight?" "Have you had lunch yet?" "Do you like boxing matches?") One or more of such questions may be transmitted to a representative's PDA, which displays the questions and instructs the representative to ask the player the questions. The representative may input the player's answers into the PDA, which transmits the answers to the central computer. These answers may then be used by the central computer to determine an appropriate offer for the player.

In one embodiment, a representative may inform a player that the player will receive an offer, but that the casino first requires more information to determine which offer. Such a dialog may be, for example, "We'd like to provide a benefit to one of your friends. Are any of them here at the casino today?"

In one embodiment, the PDA is in communication with a device (e.g., bar code reader, magnetic strip reader) capable of reading player tracking cards. A representative may use the PDA to scan a player's tracking card, thereby determining the identity of the player. The identify may be communicated to the central computer for use in determining an offer. Similarly, other forms of identifying information, such as a driver's license and credit card, may be read.

In one embodiment, a bar code reader of the representative device may be used to receive visual machine-readable information from the display of a gaming device. For example, a gaming device may display a one-dimensional bar code, two-dimensional bar code or graphical glyph, which can be read and interpreted by the bar code reader and representative device. Such information encoded in visual machine-readable form may comprise, e.g., information about the gaming session on the gaming device, information identifying the player on the gaming device, information useful in determining offers, player decision information, or any other information the gaming device may be capable of receiving or transmitting.

In one embodiment, the PDA is in communication with a recording device (e.g., a microphone and an appropriate storage medium) capable of recording audio, graphical or video input. For example, a representative may be instructed to start a conversation with a player, and record the conversation using the PDA and/or the recording device. Data representing the audio (or other form of recorded data) would be transmitted to the central computer, which in turn employs voice analysis or other known image or signal processing techniques to, e.g., estimate or determine the player's current mood. Such recorded information may also be used for purposes of verifying actions or statements of representatives and offer recipients. For example, a recording may be used to demonstrate the precise offer that a player had previously accepted.

According to one embodiment, a player may use a PDA to interact with the central computer. For example, a representative may provide his PDA to a player, who in turn uses the PDA to enter the names and address of five of his friends. In another embodiment, a representative provides his PDA to a player. The PDA runs a video game program. If the player wins the video game, attains a desired score in the game or otherwise attains a desired performance level in the game, then the player may qualify to receive an offer. In another embodiment, a representative provides his PDA to a player, who in turn uses the PDA to browse a list of potential offers displayed by the PDA. The player may then select which of the displayed offers he would like to receive. In one embodiment, some or all of the data from a PDA, or data not shown on the PDA, may be shown on the display of a gaming device, allowing a player to browse on the display of the gaming device or use what he sees on the display to render a decision.

As described above, in exchange for a benefit, a player may be required to perform or promise to perform an activity. Examples of activities include, but are not limited to applying for a new credit card account; answering survey questions about a product or service; purchasing a product or service; using a product or service; testing a product (e.g., the representative brings a product to the player and has the player try, sample, or preview it. For example, the player might be required to try a cup of coffee, take a sample issue of a magazine, or wear a new watch for an hour); selling a product or service; providing a product or service; providing information; viewing information; performing an action; telling a friend about a product or service; signing up for a magazine subscription; buying $20 worth of books from Amazon.com; signing up for a warranty; receiving a new credit card; using a new long distance telephone provider; printing at least 100 pages per week from an HP laser printer; receiving three free issues of a magazine; providing legal advice, medical advice; donating an old television set; selling a used product on eBay; providing tax advice at a rate of $10 per hour; answering survey questions; providing product ratings and reviews; indicating demographic information, purchasing information; watching a television commercial or other advertisement; listening to an audio tape about the health dangers of smoking cigarettes; reading a pamphlet that explains how to use a product; playing a game of chance or a game of skill; applying for a credit card; performing a repeated action (e.g. purchasing a product from a retailer at least once a month for the duration of an insurance policy, maintaining a balance on a credit card); performing a customer-segmenting activity (i.e. an activity that allows a seller to segment its customer base)—for example, a casino may segment its player base by asking a player to perform an activity over an extended period of time (since some players will not have the time to perform such activities). Note that if a customer-segmenting activity has no value to a subsidizer, then there may not be a subsidizer; convincing another party (e.g., another player) to perform one or more activities. For example, a first player may perform an activity of convincing three of his friends to sign up for magazine subscriptions; playing a game for a designated period of time; playing a designated number of games (e.g., two hundred handle pulls at a slot machine); placing a designated number (or dollar value) of bets; winning a designated number of games; winning a designated jackpot; winning a designated amount of money; playing a designated game; playing a game at a designated gaming device; playing a game in a designated fashion (e.g., always make the maximum bet, always hit with a hand of 'sixteen' in blackjack); signing up for a player tracking card; and/or providing gaming-related information (e.g., inserting a player tracking card, answering survey questions).

In many cases, performance of an activity by a player (or of course any recipient of the offer) provides value to a subsidizer. For example, a credit card issuer may be willing to pay up to $50 in exchange for a customer applying for a new credit card account, since acquiring a new customer on average results in greater than $50 profit for the credit card issuer.

Further, an activity may include an expiration condition. Examples include, but are not limited to an activity must be finished by a designated time (e.g., before 6 PM today); an activity must be started before a designated event (e.g., before the end of a baseball game); an activity must be performed before a designated occurrence (e.g., before another player wins a jackpot of $100 or more); and/or an activity must be performed before a designated condition is true (e.g., while there are at least four players playing particular gaming devices).

An activity may include a time-based requirement. Examples include, but are not limited to an activity must be finished by a designated time (e.g., before 6 PM tonight); an activity must be started after a designated event (e.g., after eating dinner); and/or an activity must take place during a designated time period (e.g., between 4 AM and 8 AM).

In addition, there may be restrictions as to how and where an activity is performed. For example, an activity must be performed while a player is at the casino.

A player may have to perform multiple activities in order to receive a benefit. For example, a player may have to play one hundred hands of video blackjack today, and then eat lunch at the casino buffet tomorrow. As another example, a player may have to perform a repeated activity (e.g., purchasing a product from a retailer at least once a month for the duration of an insurance policy, maintaining a predetermined balance on a credit card).

According to one embodiment, a player's completion of an activity may be based on activities of other players. For example, a player may perform a competitive activity (i.e., an activity where success is determined relative to at least one other player), such as a player may have to win a hand of poker or win a slot machine tournament. As another example, a player may perform a team activity (i.e., an activity where players work together to accomplish a common goal). For example, all the players at a bank of slot machines may have to work together to increase a progressive jackpot to be greater than $10,000.

According to one embodiment, the player may have to perform one of a plurality of activities. The player may select which activity to perform. For example, a player may be required to, at his discretion, elect to either (i) gamble continuously for the next hour or (ii) buy a ticket to a boxing match. If the player performs either activity, then he will receive a benefit.

According to one embodiment, a player may receive help in performing an activity. In this case, one or more other parties may perform an activity in the place of the player. For example, a player may be required to perform an activity of playing a slot machine continuously for four hours. The player may have three friends help him perform this activity—each person plays the slot machine for one hour, and then gives up his seat to the next person at the end of the hour so the next person can maintain the continuous play of the slot machine.

As another example, a player may be required to perform an activity of signing up for three magazine subscriptions. If the player wishes to only receive two particular magazines but the player's friend also wants a subscription, then together they meet the requirement by collectively signing up for three magazine subscriptions. Accordingly the player would receive the benefit.

As another example, a player may be required to perform an activity of completing a Tae-Bo workout. This player doesn't enjoy Tae-Bo, but his wife does. So the player's wife performs the activity of completing the Tae-Bo workout. Accordingly the player would receive the benefit.

Alternatively, with some offers it may not be permissible for a player to receive help in performing an activity.

According to one embodiment, it may be deemed acceptable for a required activity to have been performed in the past. For example, a player may be required to perform an activity of placing at least $100 worth of bets at video poker. If the player has already placed $150 worth of bets at video poker, then this may constitute performance of the activity. It may be desirable to require the player to provide evidence of the previous performance (e.g., by providing a receipt, by inserting his player tracking card allowing his play history to be accessed).

According to one embodiment, it may be permissible for a player to make a forward commitment to perform an activity. According to one embodiment, a forward commitment is an agreement to perform an activity in the future. For example, a player may be required to perform an activity of test driving a Ford Escort in the future. The player may agree to perform this activity in the future (e.g., once he returns home from visiting the casino). A benefit may be provided to the player upon the player making a forward commitment to perform the activity in the future. In some embodiments, forward commitments may include time-based requirements and/or expiration conditions.

In one embodiment, a player may agree to accept a benefit contingent on accepting a corresponding activity in the future. For example, a representative may offer a player $20 immediately if the player agrees to accept an offer for a magazine subscription in the future. Accordingly, the activity corresponding to the $20 benefit is not specified or not completely specified to the player at the time the player accepts the benefit.

In one embodiment, a benefit may comprise funds which may not be cashed out from a gaming device (or may not be cashed out before a certain time or event), but which must be used in wagers at a gaming device.

According to one embodiment, a forward commitment may be penalty-secured such that a player will be penalized for not completing the activity specified in the forward commitment. Such an embodiment can reduce the detrimental effects of cheating by the player. For example, if a forward commitment was not penalty secured, then a player may promise to perform an activity, receive a corresponding benefit, but then never perform the activity as promised. A player may be penalized if the player does not perform a required activity by a specified date, or if it is determined that the player cannot perform the activity by the specified date. For example, monetary penalties may be charged to a player's credit card, debit card, player account or other financial account. According to one embodiment, a player may be required to provide an account identifier (e.g., a credit card account number) when signing up for a penalty-secured forward commitment. Further, the account may be initially and/or periodically verified to assure that the account may be charged, and/or may be charged a predetermined amount.

As another example, products or services may be denied (e.g., the player may be barred from gambling at the casino). Penalties that involve denial of products or services may be of a limited duration or permanent.

As another example, the player may be required to perform one or more additional activities, or provide other forms of consideration.

In exchange for performing an activity a player may receive a benefit. A variety of different benefits are possible, including, but not limited to funds (e.g., money, credits redeemable at a gaming device); products (e.g., a souvenir watch, a sweatshirt, a magazine subscription); services (e.g., a free meal, a haircut); discounts on products or services to be purchased or already purchased but to be paid for (e.g., 50% off the list price of a hotel room); alternate currencies (e.g., comp points); an entry into a game of chance (e.g., a lottery ticket, a free spin on a slot machine); and/or other consideration.

Note that determining a benefit may, but need not, also include determining the value of the benefit.

Money may be provided to a player in a variety of different ways, including but not limited to as a single payment; as a set of payments (e.g., $100 a month for the next three months); in the form of a check or cash; and/or by crediting a player's financial account (e.g., bank account, credit card account, casino player account).

According to one embodiment, a benefit may be provided to a party associated with the player (e.g., a friend of the player, a family member, a charity). Although providing a benefit to, e.g., a player's favorite charity may not provide a tangible benefit to the player, the player might receive an intangible benefit (e.g., he may feel altruistic and good-hearted). Accordingly, benefits to friends of players may be particularly motivational for a player. According to one embodiment, a benefit provided to a friend of a player may be contingent on the friend performing one or more activities. For example, a player's friend may be asked to perform an activity in order to receive a benefit.

Rather than displaying the offer directly to the player, the offer may be displayed to a representative (e.g., via a representative device). This representative may then present the offer to the player in an appropriate manner.

According to one embodiment, the central computer determines (also referred to as identifying) which representative should make the offer. Methods of determining a representative are analogous to those described herein for determining an offer (e.g., the central computer may use a rules-based system, a pseudo-random system). The central computer may consider a variety of factors when identifying a representative, including characteristics of representatives, characteristics of the player and/or factors relating to offers.

Examples of characteristics of representatives include (i) activities of representatives (e.g., which representative is currently available?); (ii) skills of representatives (e.g., selling skills, language skills, knowledge of products described in the offer)—for example, if the player only speaks Spanish, then the central computer may be careful to select a representative that also speaks Spanish; (iii) responsibilities of representatives (e.g., waiting to greet players at the door, keeping the gaming devices clean, serving drinks), some of which may take precedence over making offers to players; (iv) commissions paid to representatives (e.g., which representative deserves an opportunity to earn additional commissions?); (v) locations of representatives (e.g., which representative is closest to the player?); (vi) preferences of representatives (e.g., certain representatives may prefer to make certain types of offers); and/or (vii) other measures of compatibility with the player (e.g., age, hobbies, interests).

Examples of characteristics of the player include the player's preferences (e.g. hobbies, interests); what language the player speaks; the player's offer history—offers that have been made to this player in the past (e.g., by this representative or other representatives); location of the player (e.g., proximity to representatives); current activities being performed by the player (e.g., waiting in line for a musical show); and/or information stored in the player database.

Examples of factors relating to offers include offers that have been made to this player in the past (e.g., by this representative or other representatives); offers that have been made to other players (e.g., similar players); the activity to be performed in the offer (e.g., select the representative who can best explain how to perform the activity); the benefit to be provided in the offer (e.g., select the representative who can most easily provide the benefit); and/or the length of the offer (e.g., how long will it take to complete). For example, it may be inappropriate to assign a busy representative to make an offer that typically takes five minutes to complete.

According to one embodiment, a representative identifies himself. For example, the central computer may send out a prompt to a plurality of representatives, inquiring "Who wants to make this offer?" The representative who responds first (e.g., by pressing a button on his PDA) gets to make the offer. As described herein, a representative may have identified a player to receive an offer. When identifying the player, the representative may also identify himself as the representative to make the offer to the player (e.g., "I want to make an offer to this player.").

According to one embodiment, a representative may be identified by at least one other representative. Examples include a first representative may have identified a player to receive an offer. When identifying the player, the first representative may identify a second representative to make the offer to the player (e.g., "I think we should have Bob make an offer to this player."). As another example, representatives may vote on who gets to make an offer. For example, the central computer may determine that a high roller player should receive an offer and then prompt a group of representatives to choose among themselves who gets to make the offer to the high roller player.

According to one embodiment, the player may identify a representative to make the offer. For example, a player may indicate, "I want to get an offer from Jeff (the representative in the gorilla suit)." According to one embodiment, a friend of the player may identify a representative to make the offer. For example, a friend of a player may indicate, "I want Jane (representative #34) to make an offer to my friend Andy."

Where a person (e.g., a player, a representative) identifies a representative to make an offer, the representative may be identified by providing substantially unique information about the representative. Examples include the representative's name; the representative's badge number or identification number (e.g., in an embodiment where representatives are assigned numbers by the casino); the representative's physical appearance (e.g., the representative dressed in a gorilla suit); and/or methods analogous to those used by representatives for identifying players.

Typically, an offer will be displayed to a representative using the representative's PDA. Different types of PDAs are discussed in detail herein. The term "display" is used for convenience and may also refer to other ways that an offer may be output to a representative and perceived by the representative. Examples of a PDA displaying information to a representative include an LCD screen on a notebook computer displays textual information about an offer; an earphone walkie-talkie plays an audio prompt describing an offer; and/or a Braille computer monitor/touch pad displays textual information to a blind representative.

According to one embodiment, an indication of a player may be output to a representative using a representative device. For example, a representative device may display the name and location of player to whom a representative should present an offer. Examples of indications of a player include the player's name, the player's identification number (e.g., from a tracking card), a contact identifier for the player (e.g., the player's cell phone number, email address, credit card number, hotel room, or postal address), a slot machine that is being operated by the player (e.g., the player at slot machine #25), the player's location (e.g., a representative device may display the location of the player in a casino and representative may visit this location to find the player and present an offer to the player.), indicating a sufficient number of characteristics of the player to identify him relative to other players in the area. (e.g., male, gray hair, slightly balding, mustache, wearing a red and white Hawaiian-print shirt, smoking cigar, drinking margarita), indicating an activity being performed by the player (e.g., the player operating the ATM machine), indicating a biometric of the player (e.g., a photograph of the player). A player may be indicated to a representative using a combination of different methods. For example, a representative device may direct a representative to present an offer to "Tom Jones, the red-haired player at the Wheel of Riches slot machine."

According to one embodiment, an indication of a plurality of players may be output to a representative using a representative device. For example, a representative may be prompted to present offers to all players at a group of slot machines, or any player at a bank of video poker machines. Note that identifying a group of players may include identifying a location of the group or identifying at least one player in the group. This embodiment may be particularly helpful when there are a large number of players in an area of a casino, when a plurality of players are selected to receive offers, or when an offer is to be presented to a plurality of players (e.g., for a team activity).

According to one embodiment, a representative device may display information relating to at least one player. This information may be useful in assisting a representative in presenting an offer to a player, convincing a player to accept an offer, determining a player to whom an offer should be presented, or determining an offer to present to a player. For example, a representative device may display information about a player's gaming activities (e.g., comp points), characteristics of a player (e.g., occupation, hobbies, interests, languages spoken), information about a player's visit to a casino (e.g., hotel stay, purchasing history), or other information stored in a player database.

According to one embodiment, different casino reps may have different levels of access to information that may be displayed through a representative device. For example, a low-level representative may only be allowed to display information about a player's gaming activities and previously accepted offers, whereas a higher-level (e.g., better trained) representative may also have access to information about a player's purchasing history and hotel stay.

According to one embodiment, displaying an offer to a representative is an interactive process, described in detail herein.

According to one embodiment, an offer may be displayed to multiple representatives. For example, multiple representatives may coordinate to make an offer to a player. As another example, there may be a queue of offers to be made, and all representatives are able to view the queue via their representative devices. Whenever a representative is free, he makes the next offer on the queue to the appropriate player.

An offer may be presented privately to a representative. For example, it may be desirable to ensure that no other parties (e.g., players) are able to view an offer that is presented to a representative. For example, a representative may use headphones to listen to an offer.

In one embodiment, a representative may have a security level that defines which types of information he may or may not receive. Accordingly, the representative may have to log in using the representative device and thereby make his security level known. The representative may alternatively or additionally have to use a particular representative device (or one of a set of particular representative devices) that restricts access to the appropriate types of information.

An offer may be presented publicly to a representative. For example, an offer may be displayed on a large projection television that is viewable by everyone in the sports book section of a casino. The representative may show this offer to the identified player and explain it to him.

According to one embodiment, the entire offer may not be displayed to the representative. Instead, a representative's PDA may just display enough partial information about the offer. For example, a representative's PDA may display an offer identifier (e.g., offer #3). In this example the representative may have memorized that offer #3 corresponds to offering the player 200 credits if he agrees to sign up for a new credit card.

In another embodiment, an offer may be ambiguous, allowing the representative to determine at least one portion of the offer on his own. (e.g., "Offer the player some credits for switching to MCI") A representative's PDA may also just prompt him to "Make an offer (any offer) to the player".

In another embodiment, an offer may be expressed in shorthand of some sort. For example, a representative may be able to interpret the message, "Activity: credit card, Benefit: Meal" means that the representative should make the following offer to the player, "Good afternoon, Mr. Rogers, and welcome to the Lucky Dice Casino. I hope your day is going well, and I'd like to make you a special offer. I've been authorized to give you a free meal ticket for two to eat at the Coffee Shop, located here in the casino. They're having a special today on prime rib, and beers are always just 1. All you have to do to qualify for this offer is to sign up for a new credit card from Blue Bank. If you're interested, I can process your credit card application right now. Would you like to accept this offer for a new credit card and a free meal at the Coffee Shop?"

In another embodiment, a representative may have freedom to determine how an offer is made to a player. For example, a representative may be allowed to choose his own words when making an offer to a player.

Upon viewing the offer on his PDA, the representative may then present the offer to the player. This may be done by approaching the player and speaking with him. The player is then given an opportunity to accept the offer or reject the offer.

According to various embodiments of the invention, a player may indicate his acceptance or rejection of an offer in a variety of different ways, including but not limited to speaking to the representative (e.g., "Yes", "I accept", or "No"); performing the activity described in the offer (e.g., answering survey questions); accepting the benefit described in the offer (e.g., 200 free credits); and/or operating an input device (e.g., associated with a gaming device or a PDA). For example, a representative may hand his PDA to a player so that the player can read over the terms of an offer and then press the "I accept" button on the PDA. In a second example, a video poker machine being operated by a player may display the terms of an offer along with an "I accept" touch-screen button.

If the player accepts the offer, then he agrees to perform the activity specified in the offer in exchange for receiving the benefit specified in the offer. According to one embodiment, an accepted offer may comprise an agreement or contract between the player and the casino.

According to one embodiment, the representative may use his PDA to indicate whether the player accepted or rejected the offer (e.g., by operating a keypad or touch screen).

Information about the player's acceptance or rejection of an offer may be transmitted to the central computer and stored in the offer tracking database.

According to one embodiment, the acceptance or rejection of an offer may comprise a trigger (described herein), prompting the central computer to determine a second offer that should be made to the player. This second offer may then be displayed to the representative or player through the PDA.

According to one embodiment, the player may have an opportunity to request additional information about an offer. In this case, the representative may use his PDA to access additional information about the offer (e.g., details as to exactly what activity must be performed, the conditions under which the benefit will be provided, etc.). This additional information may be stored in the offer database by the central computer.

According to one embodiment, an input device (e.g., associated with the representative's PDA or a nearby gaming device) may be used to monitor the presentation of the offer. The recording of the representative presenting the offer and the player's response may then be viewed by a casino manager or by a voice recognition module in the central computer. Monitoring the presentation of an offer may be useful for various reasons, including verifying that the representative presented the offer correctly; determining what offer was presented and how the offer was presented (e.g., in an embodiment where the representative is permitted to choose his own words when presenting the offer to the player); determining the player's reaction to the offer (e.g., happiness, ambivalence, confusion); and/or determining the player's response to the offer (e.g., accepted, rejected, ignored).

According to one embodiment, an indication of the offer may be sent to at least one friend of the player. Knowing that his friend is aware of an offer may provide additional motivation for the player to complete an activity described in an offer. For example, the central computer may prompt a casino employee to telephone a player's friend and tell him, "Your friend John has the opportunity to win $50 for you by playing slot machines at a casino." Alternatively, the central computer may email all of a player's friends (e.g., including friends who are not eligible to win benefits) and tell them that a player has accepted or rejected an offer.

According to one embodiment, the central computer may determine whether a player has performed an activity designated by an offer. This may be helpful when determining whether to provide a benefit to the player (since this benefit will typically not be provided if a player fails to perform the activity).

The method of determining whether an activity is performed is often dependent on the type of activity that a player has been prompted to perform. For example, if a player is prompted to perform an activity of making one hundred handle pulls at a slot machine, then the central computer may monitor the number of handle pulls that the player has made at the slot machine. The central computer may determine whether an activity has been performed in a variety of manners, including but not limited to receiving information from a representative (e.g., a representative may indicate that a player has filled out an application for a new credit card or agreed to purchase a magazine subscription); receiving information from the player (e.g., when a player performs an activity of making a forward commitment to test drive an automobile); receiving information from one more other computer systems (e.g., if a player is required to perform an activity of signing up for a new credit card, then the central computer may receive information from a credit bureau); monitoring a player's activities at one or more gaming devices (e.g., by communicating with a gaming device through a communication network); storing data regarding a player's gaming activities (e.g., in the player database shown in FIG. 5); receiving information from one or more gaming devices; receiving information from one or more devices (e.g., camera, recording device, sensor) placed (e.g., by a representative) on or near a gaming device; receiving information from one or more point-of-sale terminals (e.g., for activities in which the player is required to purchase a product or service); and/or monitoring conditions related to the activity (e.g., monitoring the current time if the activity has an expiration date).

In one embodiment, the activity to be performed by a player comprises making an agreement or forward commitment (e.g., agreeing to purchase a product or service). In this case, the player may complete the activity just by making the agreement, and have the benefit provided to him almost immediately.

According to one embodiment, a player may use an authentication code to prove that he performed one or more activities. This authentication code may be an alphanumeric code, password, or other information that provides the central computer with a reasonable assurance that the player performed one or more activities as required. According to one embodiment, an authentication code is produced using a cryptographic algorithm (e.g., a cryptographic hash function). Typically, an authentication code is generated by a device that has the ability to determine whether a player performed an activity. For example, a gaming device may output an authentication code indicating that a player made one hundred handle pulls at that gaming device. An authentication code may be output using an output device (e.g. a printer, a video monitor).

In one embodiment, a representative's PDA is not connected to the central computer using a communication network. In this embodiment, the representative offers a player a free meal at the casino buffet if he answers twenty survey questions. The player agrees to the offer and answers the survey questions. The representative then uses his PDA to print out an authentication code on a paper receipt and gives this receipt to the player. The player may then take this receipt to the casino buffet and request that he receive the free meal. A hostess at the casino buffet may then use a device to determine if the authentication code on the receipt is valid, indicating that the player did in fact answer the survey questions. Since the authentication code is valid, the player is allowed to eat at the casino buffet for free.

According to one embodiment, the central computer may have incomplete information as to whether a player performed an activity. For example, a dealer at a casino may be responsible for verifying that a player has gambled at least $300 at blackjack, but the dealer may forget to perform this job. In this case, the central computer may resolve this situation in a variety of different ways, including assuming that the player did in fact complete the activity and provide the benefit to him; assuming that the player did not complete the activity and not provide the benefit to him; providing a reduced or alternative benefit to the player; offering to allow the player to perform a second activity to earn the benefit; and/or asking other employees (or even other players) whether the activity was completed.

According to one embodiment, a player may be reminded of an offer while performing an activity. For example, a video screen on a gaming device may display a message to the player telling him how much longer he has to gamble before he earns a benefit. Alternatively, an animated character in a video game may remind the player that if he continues to play the game well, he may be able to win a benefit. In another embodiment, a representative may remind the player.

The representative may have several interactions with a player in the context of a single offer. For example, a representative may approach a player a first time with an offer, and the player may refuse or not immediately accept the offer. The representative may accordingly be instructed by the representative device to return one or more times to interact with the player. Alternatively, the representative device may maintain an indication of the need to return to the player (e.g., a map of the casino floor with a flashing dot to indicate slot machine #29 where the player was).

According to one embodiment, the central computer may indicate to the player whether or not he has performed an activity. For example, a gaming device operated by the player may display a text message, "Nice work! You just won a subscription to People magazine." In another embodiment, a light on top of a video poker machine may flash and an audio speaker may proclaim to a player, "Whoops! You just missed your opportunity to earn 100 comp points." In another embodiment, a video monitor on a gaming device may display a message, "You're not done yet! If you play one hundred more handle pulls at this gaming device, then you'll win a pair of tickets to Wrestlemania."

According to one embodiment, a subsidizer may provide a subsidy related to a player's performance of an activity. Such a subsidy may be provided because an activity has value to the subsidizer. For example, a subsidizer may derive value from a customer signing up for a new credit card (the issuing bank may be a subsidizer), viewing an advertisement (the advertiser may be a subsidizer), or getting three friends to register with a website (the website may be a subsidizer).

According to one embodiment, a subsidizer provides a subsidy to the casino. Examples of subsidies that may be provided to the casino include payments (e.g., in money or an alternate currency like frequent flyer miles), products, services, and other forms of consideration.

A subsidy may be provided at various different times including before, after or substantially simultaneously with an activity performed by a player. Subsidies may be provided en mass. For example, a subsidizer may pay a casino $110,000 to have players view 100,000 hours of advertisements.

Further, subsidy values may be based on a variety of factors, including those used in determining an offer, as described herein.

According to one embodiment, a subsidizer provides a subsidy directly to a player. In this case, the subsidy benefit may be equivalent to, or in addition to a benefit that is provided to the player. The subsidy may also take the form of paying all or part of the commission for a representative.

According to one embodiment, the central computer may communicate with a subsidizer device to determine information about subsidies. For example, the central computer may negotiate with merchants to develop cross subsidy offers, develop the language of the offers and associated graphics, and handle back office billing and penalties associated with the offers. In addition, the central computer may store information about subsidizers in a subsidizer database (not shown).

According to one embodiment, if a player performs an activity specified in an offer, then that player may receive a benefit. According to one embodiment, a benefit provided to a player may be determined based on the activity performed. For example, the benefit may be based on what activity is performed. For example, a player may be given a choice of gambling for three hours at a slot machine or gambling for three hours at a video poker machine. If the player gambles for three hours at the slot machine, then he earns tickets to a musical. If the player gambles for three hours at a video poker machine, then he earns tickets to a boxing match.

The benefit may also be based on how well an activity is performed. For example, a player may be given the opportunity to earn five comp points for every survey question he answers. If the player answers twelve survey questions, then he earns sixty comp points.

Note that a benefit may be provided by a variety of different parties, including the central computer (e.g., by crediting a player's financial account); the casino (e.g., a casino employee may mail a check); the representative (e.g., the representative may give a player 500 credits); and/or another party (e.g., a subsidizer, a product manufacturer, a service provider).

According to one embodiment, a representative may provide a benefit to a player using a PDA. For example, in an embodiment in which gaming devices are not networked, a player may perform an activity and earn a benefit of two hundred credits on the gaming device that he is currently operating. In order to provide this benefit to the player, a representative may first use a serial cable to connect his PDA to the gaming device. Then the representative may use his PDA to transmit an encrypted message to the gaming device, causing the gaming device to add five hundred credits to the player's balance. (A potential security risk may exist in providing a benefit in this way. However, there may also be a value in having players see a representative use his PDA to "unlock" a benefit in a gaming device or cause coins/tokens to fall into the coin tray of a gaming device.)

In an environment where the gaming devices are networked, the representative could provide a benefit to a player by providing him with a cashless gaming voucher that can be entered into the player's gaming device to increase the player's credit balance. Alternatively, the representative could swipe a card having a magnetic strip through a card reader on the gaming device in order to unlock a benefit, or to put the gaming device into a different payout mode in which top jackpots are doubled, for example.

While the above methods of providing benefits to a player may result from the acceptance by a player of one or more offers, it should also be noted that the casino may provide benefits to players without the requirement that they accept an offer. For example, a premium customer on the floor who has been playing for more than two hours may trigger a message to appear on the representative's PDA indicating that he should walk up to the player and thank him for his play, or provide a comp such as a free dinner or show. The representative could also provide a benefit as described above by using the PDA to unlock a benefit in the machine. The prompt displayed to the representative might be something like "go to machine #3419 and wish Mary Jones a happy birthday."

According to one embodiment, a player may not perform the activity specified in an offer. The central computer may respond to this occurrence in at least one of a variety of ways, including not providing the benefit to the player; providing a reduced or alternative benefit to the player; offering to allow the player to perform a second activity to earn the benefit; and/or not providing offers in the future to that player.

According to one embodiment, a player may be penalized if he does not perform an activity specified in an offer. For example, the central computer may output an offer to the player in which the player gets $15 if he pulls the handle of a slot machine one hundred times. However, if the player accepts this offer and does not spin the slot reel one hundred times, then the player will be penalized $15. Similarly, a player's performance of an activity may be penalty-secured, as described herein.

Commissions for Representatives

By compensating representatives for performing actions relating to offers, they may be more motivated to perform their jobs well.

In one embodiment, a representative may receive a commission for performing one or more actions, typically actions which are related to an offer. One possible action includes making an offer to a player. For example, a representative may get 200 points each time he makes an offer to a player. In one embodiment, a representative may get $5 each time he convinces a player to accept an offer.

In addition, a representative may receive compensation according to how these actions are performed. For example, a representative may receive 10 points for conforming exactly to the wording in a prompt, but will receive only 7 points if he paraphrases a prompt. The central computer may determine various information about an upsell. The central computer may determine whether a representative made an offer to a player and whether the offer was spoken correctly.

In one embodiment of the invention, the central computer may have access to a clock useful for determining the time taken to make an offer. For example, the central computer may determine how long it takes a representative to make an offer to a player. This information may be useful in determining compensations for representatives.

Representatives may be paid according to any of a wide variety of commission schemes. Many commission schemes are possible. For example, representatives may receive commission based upon various measurements of their performance or actions that they perform (e.g. A representative is paid $5 for each offer that he makes that is accepted by a player). The commissions paid to a representative may increase as more commissions are paid out (e.g. A representative receives $2 for completing his first offer, $3 for his second offer, $4 for his third offer). A representative may be paid according to the performance of his entire team (e.g. every representative in the video poker room gets paid $5 when any one of them completes an offer). A team commission scheme may encourage representatives to work in teams to provide better service. In one embodiment, a representative is paid according to his performance relative to other representatives. For example, representatives may be in competition to receive a prize: whoever has the most accepted offers on a given day wins the daily commission pot.

In one embodiment, the commission paid to a representative varies. For example, on Tuesdays, a representative gets $2 for each accepted offer, but on Saturdays the representative gets $1.25 for each accepted offer. A dynamic commission scheme may help to offset the effects of peak gaming hours, or prevent a representative from becoming habituated to only making a particular type of offer to a particular type of player.

The commission may be based on the profit generated by the action. For example, a representative may use his PDA to view a benefit that could be provided to a player and a list of activities that the player could perform. If the representative is successful in convincing the player to perform one of the activities, then the commission paid to the representative may be proportional to the value of the activity. That is, the representative may get a larger commission if he convinces the player to perform a high value activity.

Representatives may be paid commissions which reflect the downtime of those working under them.

In addition to the above methods of calculating commissions, commissions may be paid in many possible manners. For example, commissions may be paid at the end of the week as part of a paycheck, credited to an account (e.g. automatically credited to a specified financial account such as a bank account or credit card balance); paid through a coupon mechanism (e.g. a receipt, coupon, or check indicating his fulfillment of the prompt); paid in increments (e.g. $20 total at a rate of $5 per week for the next four weeks); and/or obtained by the representative (e.g. $1 taken out of the cash register, a free hamburger at the end of a shift).

Commissions may be provided to representatives in the form of alternate currency, such as points. That is, representatives are allocated a certain number of points for each offer. This may be done to prevent representatives from becoming discouraged by low incremental commissions (e.g. a representative may find it more appealing to receive two hundred points rather than twenty cents). Points may be accumulated over time. The various commission schemes and methods of payment used for monetary compensation are also applicable to points systems.

In one embodiment, representatives are able to convert points to money, merchandise, or services. For example, a representative may be able to trade 10,000 points for a new jacket. Each representative may be given a catalog of merchandise that can be purchased using points. Also, a commission scheme that uses points may be appealing to employers because it can help to encourage representatives to spend their commissions in certain ways. For example, representatives may be given the option of trading 1000 points for a free movie pass. (Note that a movie theater may be willing to subsidize this use of points.)

Points are only one way that representatives may receive compensation in the form of goods and services. Goods and services may also be provided independent of a points system. For example, a representative may receive a two-hour lunch break in exchange for completing a particularly valuable offer. Likewise, a representative who makes 1,000 successful offers may be entered into a lottery to win a free trip to Hawaii. Alternatively, representatives may be rewarded with coupons or other discounts on goods and services. Of course, compensation in the form of goods and services may employ any of the various payment options and commission schemes described earlier.

In addition, different representatives may receive different commissions for performing the same action, thereby providing greater commissions or personalized commissions to certain representatives. For example, a representative who is new to the job may receive greater commissions for making offers to certain types of players, thereby conditioning him to approach these players more often. A representative who enjoys basketball may receive personalized commissions by earning points towards a new pair of basketball shoes. Another representative may prefer to receive commissions in the form of cash rather than points. In one embodiment, representatives may be permitted to select their own form of personalized commissions.

According to one embodiment of the invention, the central computer uses performance feedback to determine commissions provided to representatives. The central computer may determine or receive information relating to the success of certain commission schemes, and then use this information to determine how to best compensate representatives in the future. For example, the central computer may use the same commission scheme for all representatives: each representative receives five cents for making an offer to a player. PDAs carried by representatives may then provide information to the central computer relating to the number of offers that have been accepted. In this example, only 20% of the offers have been accepted, so the central computer modifies the commission scheme so that representatives now receive ten cents for each time that they make an offer to a player.

Modifying commission, as discussed herein, is different from modifying methods of displaying commission information.

Prompt recognition and payment of sales commissions helps to motivate salesmen and other representatives. If representatives have to wait less time to receive their commissions, the rewards for good behavior are more immediate and thus more easily perceived. This helps to make commissions more appealing to representatives, which in turn motivates these representatives to sell more items.

One particularly interesting aspect of embodiments of the invention is that PDAs carried by representatives may be used to display information about commissions that may be provided to the representatives. This can help motivate representatives to make more offers, be more enthusiastic about making offers, and be more successful in convincing players to accept offers.

There are a number of different ways of displaying information about commissions. Any display strategy or combination thereof may be used with any type of commission described. For example, it is possible to output incremental information about a future commission graphically in the form of a prompt. Similarly, a representative may receive information about both his incremental commission and his cumulative commission.

Information about a commission may be output privately so that only a single representative or a specific group of representatives may view the commission information that is output. For example, commission information may be displayed to an employee on his PDA. Outputting commission information privately to a group of representatives may be particularly applicable when a team-based commission scheme is used.

Output devices may present commission information publicly. For example, a public announcement (PA) system may be used to output commission information to a group of people. Such commission information might describe how a certain representative has achieved his monthly goal of three thousand accepted offers. As another example, a video monitor visible to all representatives may display the cumulative commissions of different representatives relative to each other.

In one embodiment of the invention, commission information is described to representatives in incremental terms. In other words, the information that is output describes increments of compensation as opposed to cumulative commissions. Possible increments of compensation include the amount of commission earned for successfully completing a particular offer, the amount of commission earned for making a particular offer, and/or the amount of commission earned for a specific action.

Outputting information about incremental commissions may be particularly motivational to representatives because it may help to focus a representative's attention on the action necessary to earn each incremental commission.

Information about an incremental commission may be output after the compensation is provided. For example, after each accepted offer, a representative's PDA may display the number of points that the representative earned for making that offer.

Information about an incremental commission may be output before the compensation is provided. For example, a PDA may indicate to a representative that he should offer a player a trial magazine subscription and that he will receive 10 points for making this offer.

Information about an incremental commission may be output as part of a prompt. For example, a PDA may display a prompt to a representative, wherein this prompt includes both an offer and a commission. If the representative makes the offer, then the representative will receive the commission described in the prompt.

Information about an incremental commission may be output relative to a goal. For example, a video screen on a representative's PDA may display to him that he just moved ten points closer to his goal of winning free movie tickets.

Commission information may be output incrementally relative to other representatives. For example, Andy's PDA may display to him that he just moved fifteen points closer to Bob, who is the representative with the most cumulative points.

In one embodiment of the invention, commission information is described to representatives in cumulative terms. That is, the information that is output describes the total amount of commissions that have been earned over a given period. In one embodiment, this cumulative commission is the sum of multiple incremental commissions. Examples of cumulative commissions include the amount of commission earned during a certain period of time, the amount of commission earned during a certain number of attempted offers, and/or the amount of compensation earned by a group of representatives.

Information about cumulative commission may be output after a commission is provided. For example, after each accepted offer, a representative's PDA may display the number of points that he has earned during the last week.

Information about cumulative commissions may be output before the commission is provided. For example, representative's PDA may indicate to the representative that he should make a particular offer to a player and that the representative will have three hundred points total after making this offer.

Information about cumulative commissions may be output as part of a prompt. For example, a representative's PDA may display a prompt to the representative, wherein this prompt includes both an offer to be made and a cumulative commission value. If the representative succeeds in convincing a player to accept the offer, then the representative's total amount of commissions will be set to the value described in the prompt.

Information about a cumulative commission may be output relative to a goal. For example, a video screen may display to a representative that he needs only one hundred fifty more points to win a free pair of movie tickets. Such information may be displayed textually (e.g. "You need 150 points") or graphically (e.g. a pie chart showing what percentage of the points for the movie tickets have been earned).

Information about cumulative commissions may be output relative to other representatives. For example, a video monitor in the employee lounge may display that Andy is only fifteen points behind Bob, who is the representative with the most cumulative points for the month. Similarly, the video monitor in the employee lounge may display that Andy has 1230 points and Bob has 1245 points.

Commission may also be output relative to a goal. In one embodiment, a goal is described as a cumulative amount of commissions. For example, a representative may have a goal of earning 3000 points. However, other goals are also possible, including a cumulative amount of commissions over time (e.g. 500 points in the next hour), a cumulative amount of commission over a number of attempted offers (e.g. 500 points in the next 50 attempted offers), and/or a cumulative function of commission (e.g. an average of 10 points per offer).

In one embodiment, representatives earn commissions in the form of points. These points are a form of alternate currency, which may be exchanged for prizes like movie tickets, food, clothing, or sporting goods. Commission information may be output to a representative relative to one of these prizes. For example, an earphone may tell a representative, "You only need 65 more points to win a new pair of basketball shoes."

In one embodiment, a representative is permitted to select his own goal. For example, a representative may indicate that he wants to earn a $100 bonus or that he hopes to earn the 5000 points necessary to win a new set of golf clubs. In this case, commission may be displayed relative to the goal selected by the representative.

Commissions relative to a goal may be described in increments. For example, a representative may be told, "By completing that offer, you just earned 10 points towards a free round of golf."

Commissions relative to a goal may be described cumulatively. For example, a representative may be told, "You need just 30 more points to win the representative of the month award."

Commissions relative to a goal may be described using a cumulative function. For example, a representative may be told, "On average, you need to complete 10 more offers per hour in order to win a new skateboard before Christmas."

Past commissions may be output relative to a goal. For example, a representative may be told, "Over the last week, you earned 50 points less than you needed to win the representative of the month award."

Future commissions may be output relative to a goal. For example, a representative may be told, "If you average 10 offers per hour for the rest of this shift, then you'll win a $20 pre-paid calling card."

A prompt may include commissions relative to a goal. For example, a representative may be told, "Offer this player 50 credits if he agrees to eat dinner at the casino buffet. If he accepts, you'll need just 20 more points to earn a plaque of recognition."

Commissions may also be output relative to other representatives or other groups of representatives. In one embodiment, this may foster a spirit of competition between representatives, thereby motivating them to work harder in the hope of besting their fellow representatives. For example, Andy and Bob may be rival representatives, and Andy may be very motivated to see that he has 500 more points than Bob.

Commissions relative to other representatives may be described in incremental terms. For example, a representative's PDA may display information indicating that the representative will move five points ahead of Bob if he completes a certain offer.

Commissions relative to other representatives may be described in cumulative terms. For example, a video monitor in the employee lounge may display that Andy is only fifteen points behind Bob, who is the representative with the most cumulative points for the month. Similarly, the video monitor in the employee lounge may display that Andy has 1230 points and Bob has 1245 points.

Commissions relative to other representatives may be described in terms of a cumulative function of commission. For example, a representative's PDA may display the text, "If you average 10 points per hour for the next 2 days, then you will have more points than Bob." Similarly, a representative may be told that his average number of accepted offers per hour is 10% better than Bob's average number of accepted offers per hour.

Past commissions may be output relative to other representatives. For example, a representative's PDA may display the text, "You have 15 points less than Bob has."

Future commissions may be output relative to other representatives. For example, a representative's PDA may display the text, "If you complete this offer, then you'll have 15 points less than Bob has."

Commissions relative to other representatives may be included in a prompt. For example, a representative's PDA may display the text, "Offer this player a cookie if he'll answer a couple of survey questions. Doing this will put you 15 points ahead of Bob."

Rather than outputting the cumulative commission for a particular representative, the central computer may output any cumulative function of commissions. For example, a video screen may display to a representative his average daily commissions from the last month. Possible cumulative functions of commissions comprise the average commission over a time period, the average commission over a number of attempted offers, and the mode, derivative, rate at which commissions are changing and standard deviation of commissions received.

Information about a cumulative function of commission may be output after the commission is provided. For example, a gaming device, PDA or point-of-sale terminal may indicate to a representative that he has averaged 8.3 points per transaction over the last week.

Information about a cumulative function of commissions may be output before a commission is provided. For example, a PDA may indicate to a representative that he should offer a player a new credit card and that if he completes this offer then he will have an average of thirty two points per hour.

Information about a cumulative function of commissions may be output as part of a prompt. For example, a point-of-sale terminal may display a prompt to a representative, wherein this prompt includes both an offer and a commission. If the offer is accepted, then the representative's average amount of commission will be set to the number described in the prompt.

Information about a cumulative commission may be output relative to a goal. For example, a video screen may display to a representative that he needs to average forty-two points per hour for the rest of the day in order to win a free pair of movie tickets.

Information about a cumulative commission may be output relative to other representatives. For example, a video monitor in the employee lounge may display that Andy is averaging five fewer accepted offers per hour than Bob. Similarly, the video monitor in the employee lounge may display that Andy is averaging fourteen accepted offers per hour and Bob is averaging nineteen accepted offers per hour.

In one embodiment, the prompt that is output to a representative describes both an offer (e.g., offer to give a player a hotel room for the night if he agrees to gamble for the next 6 hours) and a commission (e.g., receive 10 points). Outputting commission information in this way may help representatives to associate particular offers with the commissions that are provided for making these offers. For example, a representative may receive a textual prompt, "If you convince the player to accept an offer for a new credit card, then you will receive 15 points."

Commission information that is output as part of a prompt may be described in incremental terms. For example, a prompt may tell a representative, "Offer this player a free Winnebago test drive and you'll get 10 points."

Commission information that is output as part of a prompt may be described in cumulative terms. For example, a prompt may tell a representative, "If you convince this player to gamble for the next 3 hours, then you will have 510 points total."

A prompt may include information about past commissions. For example, a prompt may tell a representative, "So far you have 235 points total; please offer the player a free spin if he answers a few survey questions."

A prompt may include information about future commissions. For example, a representative's PDA may display a textual prompt, "If you convince the player to accept an offer to switch his long distance telephone provider, then you will receive 10 points."

A prompt may describe a commission relative to a goal. For example, a representative's PDA may display a textual prompt, "If you offer the player 200 credits to switch his Internet service provider, then you'll only need 35 more points to win a basketball."

A prompt may describe a commission relative to other representatives. For example, a representative's PDA may display a textual prompt, "You're only 5 points behind Oscar. If you can convince this player to accept an offer to sign up for a new credit card, then you'll have the $2^{nd}$ most points of any representative."

The commission information that is output to a representative may describe a commission that has already been provided (i.e., a "past" commission). For example, a representative's PDA may display to him that he has earned 523 points in the last week. In this case, the act of outputting the commission helps to inform a representative of his past performance. Thus a representative is recognized for work that he has performed, which may help to increase morale and motivate the representative to perform similarly in the future.

Alternatively, the commission information that is output to a representative may describe a commission that has not yet been provided (i.e. a "future" commission). In one embodiment, such information about future commissions is hypothetical. That is, the representative may only receive the described commission if he performs a particular action. For example, information about a future commission may be included in a prompt that is output to a representative, "If you convince this player to accept the offer for the magazine subscription, then you will receive 15 points." Outputting information about future commissions may help to motivate a representative to perform a action in anticipation of the commission that he will receive.

In one embodiment, commission information is not output in the same way to every representative. For example, commission information may be output to a first representative by describing an incremental commission in a prompt that is displayed on the video screen of his PDA. In contrast, a second representative may use an earphone to listen to information about his cumulative commission relative to a goal.

In one embodiment, the method of outputting commission information is set independently for each representative. This way, each representative may receive commission information that is the most motivational to him. For example, one representative may be highly motivated by seeing his progress towards a goal, whereas a second representative may be more motivated to see her cumulative commission relative to other representatives.

In one embodiment, representatives are permitted to select how commission information is output to them. For example, a representative may select that he would like to receive information about his cumulative commission relative to a goal of winning a free pair of movie tickets. Likewise, representatives may be permitted to select how they receive commission information according to any of the other factors described herein. Information about commissions may then be output to representatives according to their respective selections.

In one embodiment, a representative may receive different commission information at different times. For example, it could be that a certain representative is a football fan, and on the weekends is highly motivated by receiving commission information about his progress towards winning a new football. However, on weekdays (when there is no football on television), this representative may be more motivated to receive information about his commission relative to other representatives. In this case, different commission information may be output to the representative based on the day of the week. The central computer may also determine various other reasons to vary the commission information that is output to a representative, including representative preferences, historical data, and success/failure with particular display strategies.

In one embodiment, different commission information may be output according to the transaction rate of one or more gaming devices. One reason for doing this is that it may take time for representatives to view and respond to commission information that is output to them. During periods of time when there are lots of players gambling, commission information may be output less often, or described in less detail. This should help to prevent representatives from spending too much time viewing commission information. Alternatively, during slow periods, the system may output more comprehensive information about a commission. For example, an LCD screen on a PDA may be used to display detailed information about a goal item, or a representative may be able to browse through his historical commission statistics. In addition, it may be that certain vendors may be willing to offset some of the cost for a goal item for the opportunity to provide this targeted marketing to a specific representative or groups of representatives.

In one embodiment, the central computer uses feedback to determine how to output commission information to a particular representative. That is, the central computer monitors the results of outputting certain commission information to a representative and then accordingly adjusts how commission information will be output to this representative in the future. For example, the central computer may output commission information to a representative according to a specific display strategy (e.g. cumulative commissions relative to a goal). It may then monitor the success of this display strategy, possibly by examining the offer tracking database to see the representative's success at completing offers. If this display strategy is unsuccessful in motivating the representative, then the central computer may modify the display strategy.

In a more detailed example of the use of feedback, a representative may use a PDA to indicate that he is interested in earning points toward a pair of movie tickets. However, outputting cumulative commission information relative to the goal of winning a pair of movie tickets does not seem to motivate the representative very well; only 30% of his offers are accepted by players. To rectify this situation, the central computer attempts a new display strategy, this time displaying the representative's cumulative commission relative to other representatives. This display strategy proves to be much more effective, and the representative's take rate on offers increases to 60%. Thus, feedback may be used to vary the output of commission information.

As described herein, commission information may be output in the form of text or audio. It is also possible that commission information may be represented in other forms, including graphically. For example, rather than having a representative PDA displaying text that says, "You are 205 points behind Bob," a video screen may be used to display a bar graph indicating the relative commissions of the representative and Bob.

Various other graphical outputs are also possible, and many are analogous to the textual examples described herein. For example, a video screen on a PDA may be used to display the text of a prompt ("Offer this player 100 credits if he signs up for a new credit card") and a pie graph showing how many points a representative has earned relative to his goal of winning free tickets to an amusement park.

In another example, a color LCD screen on a representative's PDA may be used to display a picture of the representative's goal item (an autographed Michael Jordan poster) and a line graph indicating the representative's progress towards achieving this goal.

In another example, a television monitor in the employee lounge is used to display an animated picture of four racecars, each one corresponding to a different representative. The racecars are shown to be racing around a track at speeds corresponding to the offer acceptance rates of each of the different representatives. The racecar in the lead will correspond to the representative who has convinced the most players to accept offers.

In one embodiment, employees receive penalties (also referred to as "negative commissions") for certain actions. Different forms of penalties are analogous to the different forms of commissions that are described herein. For example, a representative whose offer is rejected may lose ten points. Other examples of penalties include penalties applied to a team of representatives, additional work duties/hours, and penalties that vary dynamically. Outputting information about penalties is done in a similar manner to the output methods described herein.

In one embodiment, employees may receive both commissions and penalties. For example, a representative may gain ten points for making an offer to a player, but lose fifteen points if the player rejects the offer. In one embodiment, information about a penalty may be output to a representative along with an indication of how he can earn back these points. For example, a representative may be told that he just lost ten points for speaking an offer incorrectly to a player, and that he can earn back these ten points by making another offer to the player.

In one embodiment, representatives receive only penalties. For example, a representative may start his shift with 1000 points. During the course of his shift, he loses points for performing the wrong actions or performing actions incorrectly. At one point, he loses 5 points for having an offer rejected. Commission information may be displayed to the representative by showing him the total number of points that he has left out of the 1000 that he had when he started. If the representative has more than 750 points at the end of his shift, then he wins a free pair of movie tickets.

Outputting Additional Information

Additional information may be output to representatives. In one embodiment, information output to a representative includes comments, criticisms, suggestions, or encouragement from a manager or other representatives. For example, a representative may receive commission information saying, "You earned 500 more points this week than last week," with a comment from the manager, "Keep up the good work! Players will accept offers more often if you smile more." Such information may be generated by the central computer, a representative's peers or by a representative's supervisor.

In one embodiment, the central computer may additionally output information about a representative's performance. For example, a representative may use his PDA to access information about his performance statistics for the last month, including his total number of accepted offers, average rate of making offers, and most common offer accepted.

The player may provide input in the form of comments about the quality of service provided by the representatives. For example, a player might be prompted by his gaming device to answer a few questions about the service he had received. This data would then be incorporated into the evaluation of the representative.

In one embodiment, a representative's PDA may additionally output information about tasks that need to be performed. For example, information may be output to a representative indicating that he should take out the trash. In one embodiment, representatives may earn additional commissions by performing tasks. For example, a representative may be prompted, "If you get a drink for this player, then you will receive 15 points." Examples of tasks include assisting players (e.g., getting drinks, providing directions, instructing a player how to play a game) and maintenance activities (e.g., cleaning up spilled drinks, cleaning ashtrays).

Call Center Presents Offer

According to one embodiment, a representative may use a communication device (e.g., a telephone) to communicate with a player (e.g., present an offer to the player).

A player may operate a communication device in order to speak with the representative. One form of communication devices comprises a built-in telephone on a gaming device. The telephone may ring whenever the representative would like to make an offer to the player (e.g., in response to a trigger event). The player may need only pick up the telephone handset in order to hear the offer.

One form of communication device comprises a cellular telephone (e.g., the player's personal cell phone). The player may provide his cell phone number to the casino when he signs up for a player tracking card.

One form of communication device comprises a home telephone (e.g., in an embodiment where the player is gambling over the Internet).

One form of communication device comprises a streaming videophone connection in an Internet browser pop-up window (e.g., in an embodiment where the player is gambling over the Internet).

A representative may not be present on the floor of a casino when communicating with the player. Instead, the representative may be an operator at a call center. One advantage of this arrangement is that representatives may be able to provide more offers to players, since the representative need not spend time walking around the casino.

In one embodiment, the representative acts at the direction of another person who provides instructions through any of a number of devices, such as an audio output (e.g., an earpiece communicating wirelessly with a transmitter) or a textual or graphical output (the display of a PDA).

MLM

According to one embodiment, a player may perform the job of a representative. That is, a first player may view an offer and then present this offer to a second player. The second player may then choose to accept or reject the offer. If the second player accepts the offer and performs an activity specified in the offer, then he will receive a benefit. In addition, the first player may receive a benefit.

Although the present invention has been described with respect to a preferred embodiment thereof, those skilled in the art will note that various substitutions may be made to those embodiments described herein without departing from the spirit and scope of the present invention.

In one embodiment, a representative may direct a player to switch to another gaming device (e.g., a gaming device with a higher expected payout amount).

In one embodiment, a representative may perform services for a player, such as digitizing (converting to computer format) a photograph possessed by customer. The digitized image is then transmitted to a gaming device, and may even be used in displaying elements of the game on the gaming device. For example, a portion of the digitized image may be used on the reels of a video slot machine.

In one embodiment, a representative may be directed by a representative device to (i) help a player carry coins or tokens to a change booth, (ii) sell gambling insurance to a player, possibly explaining premium costs and benefits of various policies to the player, (iii) take sports book wagers from a player, (iv) gamble with the player, either at a gaming device or without the aid of a gaming device, (v) assist a player in checking in or out of a hotel, (vi) deliver food to a player, (vii) explain the rules of a game or of a gaming device to a player, (viii) provide the player with a device that allows the player to summon the representative, or summon any other representative; and/or (ix) go meet a player at a time and/or location previously requested by a player.

In one embodiment, the player may have the capability to indicate that he is not willing to speak with a representative. For example, the gaming device may provide an appropriate control (e.g., a "Do Not Disturb" button) that communicates such an intent to the central computer, or indicates such intent to a representative in the area (e.g., causing the background of the display of the gaming device to display a specific symbol readily seen by someone nearby). Alternatively, the player may have another device (e.g., provided by a representative, a casino for hotel) that (i) communicates with the central controller to indicate that he is not willing to speak with a representative, and/or (ii) indicates such intent to a representative in the area (e.g., a flashing red LED readily seen by someone nearby).

In one embodiment, a representative may comprise a monitor (e.g., a large flat panel display located in the ceiling of a casino) which deploys and is visible to players at various times as directed by the central computer or people (e.g., other representatives).

In one embodiment, a representative may be a mechanical device directed to move by the central computer or people (e.g., other representatives).

In one embodiment, a representative device may output all or a portion of the offer to a player. For example, the representative device may include an audio output (such as a speaker) that informs a player of certain details of an offer.

What is claimed is:

1. A method of operating a gaming system comprising:
   (a) causing at least one processor to select a recipient of an offer from a list of possible recipients, said selected recipient including a player at a gaming device in a casino;
   (b) causing the at least one processor to determine the offer for said selected recipient, the offer including:

(i) an activity to be performed by the selected recipient after receiving information about the offer, and (ii) a plurality of free credits for play of the gaming device to be provided to the selected recipient if the activity is performed;

(c) causing the at least one processor to wirelessly transmit instructions to a device associated with a casino representative instructing the casino representative to provide the information about the offer to the selected recipient, said information including a description of the activity and the plurality of free credits;

(d) after the information about the offer is provided to the selected recipient, causing the at least one processor to receive an indication of whether the selected recipient has performed the activity; and (e) in response to receiving an indication that the selected recipient has performed the activity, causing the plurality of free credits for play of the gaming device to be provided to the selected recipient.

2. The method of claim 1, further comprising causing the at least one processor to transmit information about the selected recipient to the device associated with the casino representative, the information about the selected recipient including at least one of: a name of the recipient; a location of the recipient in the casino; an identification number of the recipient; and a contact identifier of the recipient.

3. A non-transitory computer readable medium which stores a plurality of instructions, which when executed by at least one processor, cause the at least one processor to:

(a) select a recipient from a list of possible recipients, said selected recipient including a player at a gaming device in a casino;

(b) determine an offer for said selected recipient, said offer including:

(i) an activity to be performed by the selected recipient after receiving information about the offer, and (ii) a benefit to be provided to the selected recipient if the activity is performed; and (c) wirelessly transmit instructions to a casino representative device to provide the information about the offer to the selected recipient, the information including a description of the activity to be performed by the selected recipient and the benefit to be provided to the selected recipient if the activity is performed.

4. The non-transitory computer readable medium of claim 3, wherein the plurality of instructions, when executed by the at least one processor, cause the at least one processor to transmit information about the selected recipient to said device associated with the casino representative, the information about the selected recipient including at least one of: a name of the recipient; a location of the recipient in the casino; an identification number of the recipient; and a contact identifier of the recipient.

5. A gaming system comprising:

a central computer;

a plurality of casino representative devices configured to communicate with the central computer, each of said plurality of casino representative devices associated with one of a plurality of casino representatives;

a plurality of gaming devices configured to communicate with the central computer; and a memory device which stores a plurality of instructions, which when executed by the central computer, cause the central computer to:

(a) determine a recipient of the offer, said recipient including a player at one of said plurality of gaming devices;

(b) determine the offer, said offer including:

(i) an activity to be performed by the recipient after receiving information describing the offer, and (ii) a benefit to be provided to the recipient if the activity is performed;

(c) determine one of said casino representatives; and (d) wirelessly transmit instructions to the casino representative device associated with said determined one of the casino representatives to provide the information describing the offer to the recipient.

6. The gaming system of claim 5, wherein the plurality of instructions, when executed by the central computer, cause the central computer to transmit information about the recipient to the device associated with the determined one of the casino representatives, said information about the recipient including at least one of: a name of the recipient; a location of the recipient in a casino; an identification number of the recipient; and a contact identifier of the recipient.

* * * * *

UNITED STATES PATENT AND TRADEMARK OFFICE
CERTIFICATE OF CORRECTION

| | | |
|---|---|---|
| PATENT NO. | : 7,950,997 B2 | |
| APPLICATION NO. | : 11/552793 | |
| DATED | : May 31, 2011 | |
| INVENTOR(S) | : Jay S. Walker et al. | |

It is certified that error appears in the above-identified patent and that said Letters Patent is hereby corrected as shown below:

In Claim 4, column 40, line 5, delete "device associated with the."

In Claim 4, column 40, line 5, after "casino representative," add --device--.

In Claim 5, column 40, line 21, replace "the" with --an--.

In Claim 6, column 40, line 37, between "the" and "device," add --casino representative--.

Signed and Sealed this
Ninth Day of August, 2011

David J. Kappos
*Director of the United States Patent and Trademark Office*